United States Patent
Tasaki et al.

(10) Patent No.: US 12,250,237 B2
(45) Date of Patent: Mar. 11, 2025

(54) ANOMALY DETECTION DEVICE, ANOMALY DETECTION METHOD, AND RECORDING MEDIUM

(71) Applicant: Panasonic Intellectual Property Corporation of America, Torrance, CA (US)

(72) Inventors: Hajime Tasaki, Osaka (JP); Takamitsu Sasaki, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 425 days.

(21) Appl. No.: 17/671,781

(22) Filed: Feb. 15, 2022

(65) Prior Publication Data

US 2022/0174084 A1   Jun. 2, 2022

Related U.S. Application Data

(63) Continuation of application No. PCT/JP2020/042426, filed on Nov. 13, 2020.

(30) Foreign Application Priority Data

Jan. 20, 2020   (JP) .................. 2020-007096

(51) Int. Cl.
*G07C 5/08* (2006.01)
*H04L 9/40* (2022.01)

(52) U.S. Cl.
CPC ........ *H04L 63/1425* (2013.01); *G07C 5/0808* (2013.01); *G07C 5/0816* (2013.01)

(58) Field of Classification Search
CPC . H04L 63/1425; G07C 5/0808; G07C 5/0816; G08G 1/0112; G08G 1/0133;
(Continued)

(56) References Cited

U.S. PATENT DOCUMENTS 10,616,257 B1 *   4/2020   Soulhi ................. H04L 63/1425
10,650,682 B2 *   5/2020   Grewe .................... G01S 13/86
(Continued)

FOREIGN PATENT DOCUMENTS

CN   106647724   5/2017
CN   105844904   9/2019
(Continued)

OTHER PUBLICATIONS

International Search Report (ISR) from International Searching Authority (Japan Patent Office) in International Pat. Appl. No. PCT/JP2020/042426, dated Jan. 12, 2021, together with an English language translation.

(Continued)

*Primary Examiner* — Joseph J Dallo
(74) *Attorney, Agent, or Firm* — Greenblum and Bernstein, P.L.C.

(57) ABSTRACT

An anomaly detection device includes: an obtainer that obtains vehicle information related to the status of a vehicle and including location data indicating the location of the vehicle; a model storage that stores, for each of a plurality of cells of a grid imposed on a map, an evaluation model for evaluating the vehicle information of the vehicle located at the cell; and a determiner that calculates, based on the vehicle information and evaluation models each being the evaluation model and corresponding to evaluation cells including a first cell including the location of the vehicle indicated in the location data and one or more second cells each having a predetermined positional relationship with the first cell, an anomaly level indicating a degree of anomaly of (Continued)

the vehicle information, determines, based on the anomaly level, whether the vehicle information is anomalous, and outputs a determination result.

15 Claims, 21 Drawing Sheets

(58) Field of Classification Search
CPC ....... G05B 23/02; G06F 21/554; G06F 30/20; G06F 30/15; G06F 2119/02; H04W 12/63
See application file for complete search history.

(56) References Cited

U.S. PATENT DOCUMENTS

| | | | | |
|---|---|---|---|---|
| 2001/0018628 A1* | 8/2001 | Jenkins | ................... | G08G 1/127 |
| | | | | 701/123 |
| 2019/0332728 A1* | 10/2019 | Perez-Raya | ............. | G06F 30/20 |
| 2019/0353813 A1* | 11/2019 | Cobos | ...................... | G06F 30/20 |
| 2019/0392093 A1* | 12/2019 | Huang | .................... | G06T 17/20 |
| 2020/0186994 A1* | 6/2020 | Austin | .................. | H04W 4/025 |
| 2020/0202651 A1* | 6/2020 | Singh | .................. | H04W 12/069 |
| 2020/0271801 A1* | 8/2020 | Kayum | .................. | G06F 9/5066 |
| 2020/0341057 A1* | 10/2020 | Cheng | .............. | G01R 31/31724 |

FOREIGN PATENT DOCUMENTS

| | | |
|---|---|---|
| JP | 2015-026252 | 2/2015 |
| JP | 2019-096191 | 6/2019 |

OTHER PUBLICATIONS

Extended European Search Report (EESR) from European Patent Office (EPO) in European Patent Appl. No. 20915282.6, dated Jun. 16, 2023.
Li et al., huaxin.li@intel.com: "Poster: Intrusion Detection System for In-vehicle Networks using Sensor Correlation and Integration", Proceedings of the 18th ACM/IFIP/USENIX Middleware Conference, ACMPUB27, New York, NY, USA, Oct. 30, 2017 (Oct. 30, 2017), pp. 2531-2533, XP058697993.
Office Action issued by the China National Intellectual Property Administration (CNIPA) in Chinese Patent Application No. 202080034244.5, dated Dec. 27, 2024, together with an English language translation of the search report.

* cited by examiner

FIG. 6

| Vehicle information ID | Vehicle ID | Time stamp | Location data (Latitude/Longitude) | Cell ID | speed [km/h] | Steering angle [deg] | Yaw rate [deg/sec] | Longitudinal acceleration [G] | Lateral acceleration [G] |
|---|---|---|---|---|---|---|---|---|---|
| D001 | V001 | 2019/10/01 08:05:30 | (E139, N34) | G002 | 50.5 | 5.0 | 0.02 | 0.01 | 0.02 |
| D002 | V001 | 2019/10/01 08:05:31 | (E138, N34) | G003 | 49.8 | 0.0 | 0.00 | 0.00 | 0.00 |
| D003 | V001 | 2019/10/01 08:05:32 | (E137, N34) | G001 | 59.4 | 2.5 | 0.01 | 0.01 | 0.02 |
| D004 | V001 | 2019/10/01 08:05:33 | (E136, N34) | G002 | 79.1 | 2.5 | 0.01 | 0.01 | 0.02 |
| ... | ... | ... | ... | ... | ... | ... | ... | ... | ... |

FIG. 7

| Vehicle information ID | Vehicle ID | Time stamp | Location data (Latitude/ Longitude) | Cell ID | speed [km/h] | Steering angle [deg] | Yaw rate [deg/sec] | Longitudinal acceleration [G] | Lateral acceleration [G] | Determination result | Anomaly level | Anomaly series ID |
|---|---|---|---|---|---|---|---|---|---|---|---|---|
| D001 | V001 | 2019/10/01 08:05:30 | (E139, N34) | G001 | 50.5 | 5.0 | 0.02 | 0.01 | 0.02 | Anomalous | 0.89 | S001 |
| D002 | V001 | 2019/10/01 08:05:31 | (E138, N34) | G002 | 49.8 | 0.0 | 0.00 | 0.00 | 0.00 | Normal | 0.11 | - |
| D003 | V001 | 2019/10/01 08:05:32 | (E137, N34) | G002 | 59.4 | 2.5 | 0.01 | 0.01 | 0.02 | Anomalous | 0.91 | S002 |
| D004 | V001 | 2019/10/01 08:05:33 | (E136, N34) | G003 | 79.1 | 2.5 | 0.01 | 0.01 | 0.02 | Anomalous | 0.92 | S002 |
| ... | ... | ... | ... | ... | ... | ... | ... | ... | ... | ... | ... | ... |

FIG. 8

| Cell ID | Latitude/ Longitude (4 corners of region) | Number of data items | Speed [km/h] (MIN, MAX) | Steering level [deg] (MIN, MAX) | Yaw rate [deg/sec] (MIN, MAX) | Longitudinal acceleration [G] (MIN, MAX) | Lateral acceleration [G] (MIN, MAX) |
|---|---|---|---|---|---|---|---|
| 1 | (E139, N34) (E139, N35) (E138, N34) (E138, N35) | 100 | (0, 80) | (-20, 20) | (0.0, 0.1) | (0.0, 0.4) | (0.0, 0.2) |
| 2 | (E138, N34) (E138, N35) (E137, N34) (E137, N35) | 220 | (0, 75) | (-20, 25) | (0.0, 0.2) | (0.0, 0.2) | (0.0, 0.3) |
| 3 | (E137, N34) (E137, N35) (E136, N34) (E136, N35) | 180 | (10, 80) | (-0, 20) | (0.0, 0.3) | (0.0, 0.3) | (0.1, 0.2) |
| ... | ... | ... | ... | ... | ... | ... | ... |

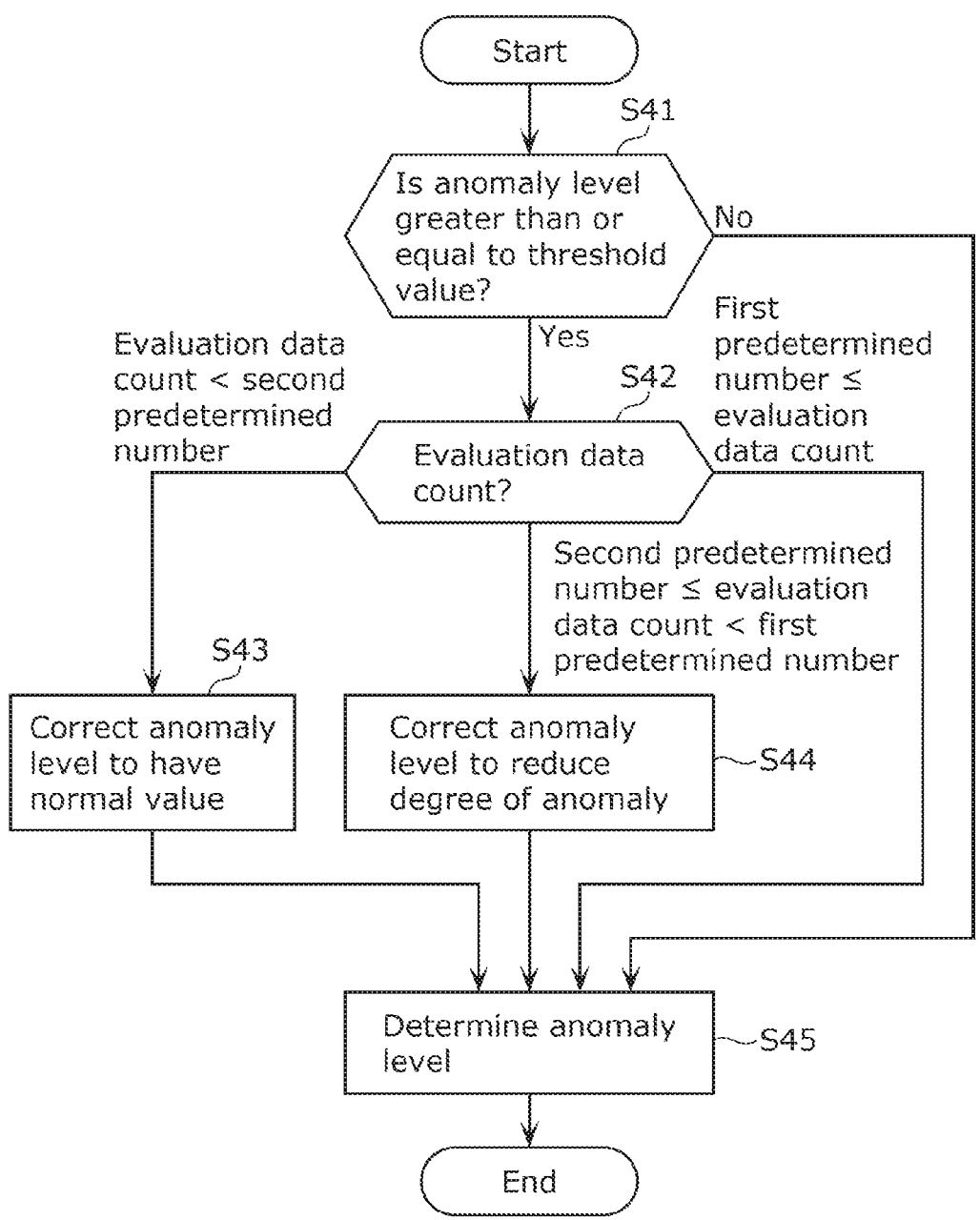

ANOMALY DETECTION DEVICE, ANOMALY DETECTION METHOD, AND RECORDING MEDIUM

CROSS REFERENCE TO RELATED APPLICATIONS

This is a continuation application of PCT International Application No. PCT/JP2020/042426 filed on Nov. 13, 2020, designating the United States of America, which is based on and claims priority of Japanese Patent Application No. 2020-007096 filed on Jan. 20, 2020. The entire disclosures of the above-identified applications, including the specifications, drawings and claims are incorporated herein by reference in their entirety.

FIELD

The present disclosure relates to anomaly detection devices that detect vehicle-related anomalies.

BACKGROUND

Conventionally, anomaly detection devices that detect vehicle-related anomalies are known (for example, refer to Patent Literature (PTL) 1).

CITATION LIST

Patent Literature

[PTL 1] Japanese Unexamined Patent Application Publication No. 2015-026252

SUMMARY

Technical Problem

There is a demand for improved accuracy of anomaly detection in anomaly detection devices that detect vehicle-related anomalies.

In view of this, an object of the present disclosure is to provide an anomaly detection device capable of detecting anomalies with improved accuracy compared to the conventional anomaly detection device.

Solution to Problem

An anomaly detection device according to one aspect of the present disclosure includes: an obtainer that obtains vehicle information related to a status of a vehicle and including location data indicating a location of the vehicle; a model storage that stores, for each of a plurality of cells of a grid imposed on a map, an evaluation model for evaluating the vehicle information of the vehicle located at the cell; and a determiner that calculates, based on the vehicle information and evaluation models each being the evaluation model, an anomaly level indicating a degree of anomaly of the vehicle information, determines, based on the anomaly level, whether the vehicle information is anomalous, and outputs a determination result, the evaluation models corresponding to evaluation cells including a first cell including the location of the vehicle indicated in the location data and one or more second cells each having a predetermined positional relationship with the first cell.

An anomaly detection method according to one aspect of the present disclosure is performed by an anomaly detection device which stores, for each of a plurality of cells of a grid imposed on a map, an evaluation model for evaluating vehicle information related to a status of a vehicle located at the cell and including location data of the vehicle, and the anomaly detection method includes: obtaining the vehicle information; calculating, based on evaluation models each being the evaluation model, an anomaly level indicating a degree of anomaly of the vehicle information, the evaluation models corresponding to evaluation cells including a first cell including a location of the vehicle indicated in the location data and one or more second cells each having a predetermined positional relationship with the first cell; determining, based on the anomaly level, whether the vehicle information is anomalous; and outputting a determination result.

A recording medium according to one aspect of the present disclosure is a non-transitory computer-readable recording medium having recorded thereon a program which causes an anomaly detection device, which stores, for each of a plurality of cells of a grid imposed on a map, an evaluation model for evaluating vehicle information related to a status of a vehicle located at the cell and including location data of the vehicle, to perform an anomaly detection process including: obtaining the vehicle information; calculating, based on evaluation models each being the evaluation model, an anomaly level indicating a degree of anomaly of the vehicle information, the evaluation models corresponding to evaluation cells including a first cell including a location of the vehicle indicated in the location data and one or more second cells each having a predetermined positional relationship with the first cell; determining, based on the anomaly level, whether the vehicle information is anomalous; and outputting a determination result.

Advantageous Effects

With the anomaly detection device, etc., according to one aspect of the present disclosure, it is possible to provide an anomaly detection device capable of detecting anomalies with improved accuracy compared to the conventional anomaly detection device.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 6 is a schematic diagram illustrating one example of the data structure of vehicle information according to an embodiment.

FIG. 7 is a schematic diagram illustrating one example of the data structure of vehicle information according to an embodiment.

FIG. 8 is a schematic diagram illustrating one example of the data structure of an evaluation model according to an embodiment.

FIG. 15 is a flowchart illustrating one example of an anomaly level correction method.

DESCRIPTION OF EMBODIMENTS

Figure 1:
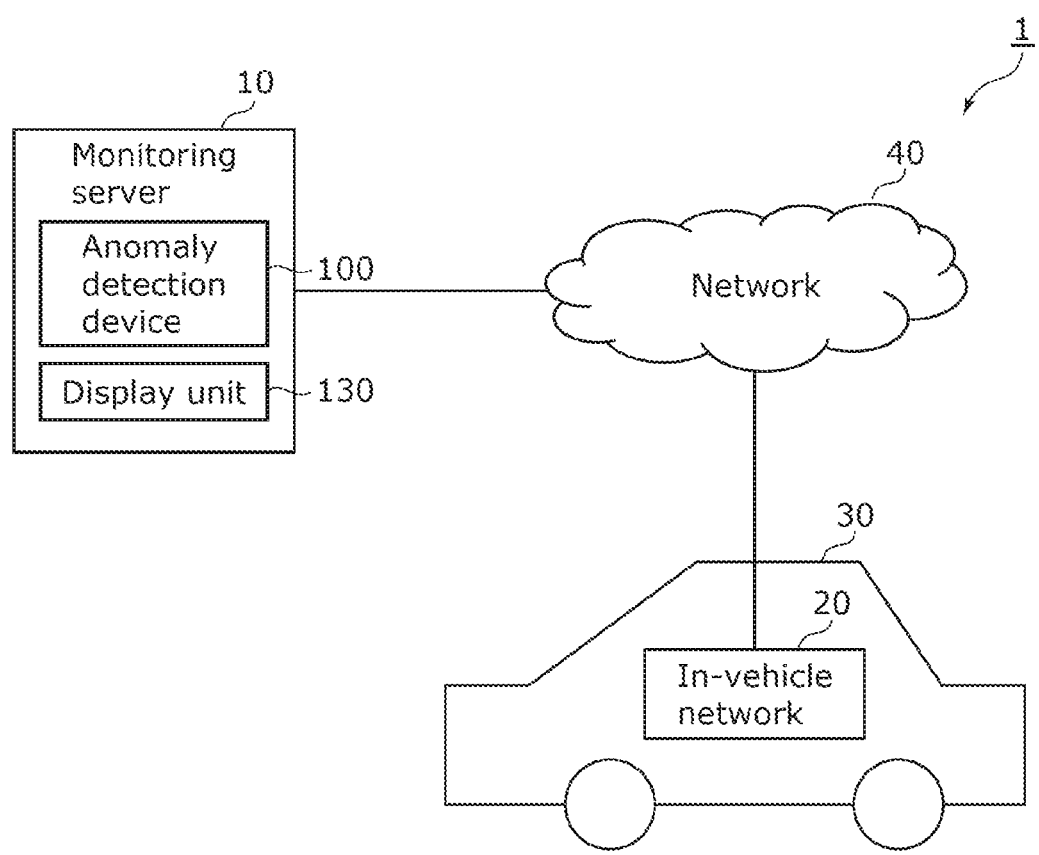
FIG. 1 is a block diagram illustrating one example of the configuration of an information processing system according to an embodiment.

[Underlying Knowledge Forming Basis of One Aspect of the Present Disclosure]

A plurality of electronic control units (hereinafter also referred to as ECUs) are mounted on vehicles such as automobiles. The vehicles are controlled by performing communication via an in-vehicle network connecting the ECUs. A controller area network (CAN), which is widely used, is one standard for such an in-vehicle network.

An in-vehicle network that complies with the CAN protocol can be built as a closed communication path on a single vehicle. However, an in-vehicle network built as an externally accessible network is often mounted on a vehicle. For example, in the in-vehicle network, a port is installed through which information passing through the network is taken out for the purpose of being used to diagnose each system mounted on the vehicle, and a car navigation system including a function for connecting to a wireless local area network (LAN) that can be connected to an external network is connected to the in-vehicle network. Making the in-vehicle network externally accessible can lead to improved convenience for users of the vehicle, but increases risk.

For example, in 2013, it was demonstrated that unauthorized vehicle control is possible from outside of the in-vehicle network through the misuse of the parking assist feature or the like. Furthermore, in 2015, it was demonstrated that unauthorized remote control of a specific model of car is possible, and this model was then recalled as a result of said demonstration.

One technique for attacking the in-vehicle network is externally accessing an ECU connected to the network, taking over the ECU, causing the ECU to transmit a frame for attacks (hereinafter also referred to as an attack frame), and improperly controlling the automobile. The attack frame is an anomalous frame different in some aspect from a normal frame passing through the in-vehicle network that has not been attacked.

As a technique for detecting such an anomaly in the in-vehicle network, a method for applying a statistical approach to travel data of the vehicle is disclosed in PTL 1, for example.

In this anomaly detection technique, a feature, a mechanical learning parameter group, or the like to be used as a reference for anomaly detection is created as an evaluation model, and determination is made on the basis of whether the current data deviates from the evaluation model. However, in such a conventional technique, the evaluation model is created using travel data measured in a wide travel region, and thus in the anomaly detection in which the evaluation model including the travel data obtained in various travel environments is used, for example, even if an anomalous acceleration instruction is provided on an ordinary road by an attack, the acceleration instruction is regarded as being normal and this anomaly cannot be determined as long as its speed can be measured on freeways.

Like this example, with the conventional technique, there is an attack that cannot be determined as being anomalous, depending on the location of the vehicle, leading to the problem of decreased detection accuracy.

In view of this, the inventors repeated diligent examinations and experiments to solve the aforementioned problem. As a result, the inventors have conceived of the anomaly detection device, the anomaly detection method, and the recording medium described below.

An anomaly detection device according to one aspect of the present disclosure includes: an obtainer that obtains vehicle information related to a status of a vehicle and including location data indicating a location of the vehicle; a model storage that stores, for each of a plurality of cells of a grid imposed on a map, an evaluation model for evaluating the vehicle information of the vehicle located at the cell; and a determiner that calculates, based on the vehicle information and evaluation models each being the evaluation model, an anomaly level indicating a degree of anomaly of the vehicle information, determines, based on the anomaly level, whether the vehicle information is anomalous, and outputs a determination result, the evaluation models corresponding to evaluation cells including a first cell including the location of the vehicle indicated in the location data and one or more second cells each having a predetermined positional relationship with the first cell.

This anomaly detection device determines, on the basis of the evaluation models for evaluation cells each having a predetermined positional relationship with the location of the vehicle, whether the vehicle information is anomalous. Therefore, with this anomaly detection device, it is possible to detect a vehicle-related anomaly on the basis of the evaluation models for a local region corresponding to the location of the vehicle. Thus, with this anomaly detection device, it is possible to detect anomalies with improved accuracy compared to the conventional anomaly detection device.

Furthermore, when the anomaly level is greater than or equal to a threshold value, the determiner may determine that the vehicle information is anomalous.

Furthermore, when the anomaly level is greater than or equal to a threshold value and an evaluation data count, which is a sum of data items used to create the evaluation model for each cell included in the evaluation cells, is less than a first predetermined number, the determiner may correct the anomaly level to reduce the degree of anomaly, and determine, based on the anomaly level corrected, whether the vehicle information is anomalous.

Furthermore, when the anomaly level is greater than or equal to the threshold value and the evaluation data count is less than a second predetermined number smaller than the first predetermined number, the determiner may correct the anomaly level to reduce the degree of anomaly until the degree of anomaly indicates that the vehicle information is normal.

Furthermore, when the anomaly level is greater than or equal to the threshold value and the evaluation data count is less than the first predetermined number, the determiner may correct the anomaly level by multiplying the anomaly level by a ratio of the evaluation data count to the first predetermined number.

Furthermore, the vehicle information may further include speed data indicating a travel speed of the vehicle, when the travel speed indicated in the speed data is less than a first speed, the determiner may set a first predetermined positional relationship to the predetermined positional relationship, and when the travel speed is greater than or equal to the first speed, the determiner may set a second predetermined positional relationship to the predetermined positional relationship, and a total number of the second cells each having the second predetermined positional relationship may be greater than a total number of the second cells each having the first predetermined positional relationship.

Furthermore, the vehicle information may further include speed data indicating a travel speed of the vehicle, when the travel speed indicated in the speed data is less than a first speed, the determiner may set a first predetermined positional relationship to the predetermined positional relationship, and when the travel speed is greater than or equal to the first speed, the determiner may set a second predetermined positional relationship to the predetermined positional relationship, and a total number of second cells arranged in a first direction from the first cell among the second cells each having the second predetermined positional relationship may be greater than a total number of second cells arranged in the first direction from the first cell among the second cells each having the first predetermined positional relationship.

Furthermore, the obtainer may sequentially obtain the vehicle information, the determiner may sequentially calculate the anomaly level, sequentially determine whether the vehicle information is anomalous, and sequentially output the determination result, and the anomaly detection device may further include: an accumulator that sequentially stores, in association with each other, the determination result sequentially output from the determiner and the location data corresponding to the determination result; and an anomaly series determiner that, in a case where a first determination result output from the determiner indicates that the vehicle information is anomalous and a second determination result stored in the accumulator a last time indicates that the vehicle information is anomalous, when a distance between a first location indicated in first location data corresponding to the first determination result and a second location indicated in second location data associated with the second determination result is less than a predetermined distance, determines the first determination result and the second determination result as being of a same anomaly series.

Furthermore, the vehicle information may further include speed data indicating a travel speed of the vehicle, and when the first determination result output from the determiner indicates that the vehicle information is anomalous, the anomaly series determiner may set the predetermined distance according to the travel speed indicated in the speed data corresponding to the first determination result.

Furthermore, the anomaly detection device may further include a display controller that causes a display unit to display at least a portion of the map, and in a case where the anomaly series determiner determines the first determination result and the second determination result as being of the same anomaly series, the anomaly series determiner may determine that each of the first cell corresponding to the first determination result and the first cell corresponding to the second determination result is an anomalous cell, and the display controller may cause the display unit to display at least a portion of the map in a manner that the anomalous cell is displayed in a display format different from a display format of other cells.

Furthermore, in the case where the anomaly series determiner determines the first determination result and the second determination result as being of the same anomaly series, when a first anomalous cell corresponding to the first determination result and a second anomalous cell corresponding to the second determination result have a predetermined relationship, the anomaly series determiner may further determine that a cell located between the first anomalous cell and the second anomalous cell is the anomalous cell.

Furthermore, the vehicle information may further include speed data indicating a travel speed of the vehicle, and when the first determination result indicates that the vehicle information is anomalous, the anomaly series determiner may set the predetermined relationship according to the travel speed indicated in the speed data corresponding to the first determination result.

Furthermore, in the case where the anomaly series determiner determines the first determination result and the second determination result as being of the same anomaly series, when a cell adjacent to a first anomalous cell corresponding to the first determination result and a second anomalous cell corresponding to the second determination result exists and a road area ratio in the cell is less than a predetermined area ratio, the anomaly series determiner may further determine that the cell is the anomalous cell.

An anomaly detection method according to one aspect of the present disclosure is performed by an anomaly detection device which stores, for each of a plurality of cells of a grid imposed on a map, an evaluation model for evaluating vehicle information related to a status of a vehicle located at the cell and including location data of the vehicle, and the anomaly detection method includes: obtaining the vehicle information; calculating, based on evaluation models each being the evaluation model, an anomaly level indicating a degree of anomaly of the vehicle information, the evaluation models corresponding to evaluation cells including a first cell including a location of the vehicle indicated in the location data and one or more second cells each having a predetermined positional relationship with the first cell; determining, based on the anomaly level, whether the vehicle information is anomalous; and outputting a determination result.

In this anomaly detection method, whether the vehicle information is anomalous is determined on the basis of the evaluation models for evaluation cells each having a predetermined positional relationship with the location of the vehicle. Therefore, with this anomaly detection method, it is possible to detect a vehicle-related anomaly on the basis of the evaluation models for a local region corresponding to the location of the vehicle. Thus, with this anomaly detection method, it is possible to detect anomalies with improved accuracy compared to the conventional anomaly detection device.

A recording medium according to one aspect of the present disclosure is a non-transitory computer-readable recording medium having recorded thereon a program which causes an anomaly detection device, which stores, for each of a plurality of cells of a grid imposed on a map, an evaluation model for evaluating vehicle information related to a status of a vehicle located at the cell and including location data of the vehicle, to perform an anomaly detection process including: obtaining the vehicle information; calculating, based on evaluation models each being the evaluation model, an anomaly level indicating a degree of anomaly of the vehicle information, the evaluation models corresponding to evaluation cells including a first cell including a location of the vehicle indicated in the location data and one or more second cells each having a predetermined positional relationship with the first cell; determining, based on the anomaly level, whether the vehicle information is anomalous; and outputting a determination result.

In the above-described program, whether the vehicle information is anomalous is determined on the basis of the evaluation models for evaluation cells each having a predetermined positional relationship with the location of the vehicle. Therefore, with the above-described program, it is possible to detect a vehicle-related anomaly on the basis of the evaluation models for a local region corresponding to the location of the vehicle. Thus, with the above-described recording medium, it is possible to detect anomalies with improved accuracy compared to the conventional anomaly detection device.

Hereinafter, a specific example of an anomaly detection device according to one aspect of the present disclosure will be described with reference to the drawings. Each embodiment described below shows a specific example of the present disclosure. Thus, the numerical values, shapes, structural elements, and the arrangement and connection of the structural elements, steps, the processing order of the steps etc., shown in the following embodiment are mere examples, and are not intended to limit the present disclosure. Note that the figures are schematic diagrams and are not necessarily precise illustrations. In the respective figures, substantially identical elements are assigned the same reference signs, and overlapping description is omitted or simplified.

[Embodiment]

Hereinafter, an anomaly detection device according to an embodiment will be described. This anomaly detection device detects vehicle-related anomalies, for example, anomalies due to cyberattacks and the like on vehicles.

<Configuration of Anomaly Detection Device>

FIG. 1 is a block diagram illustrating one example of the configuration of information processing system 1 which monitors anomalies in vehicle 30 using anomaly detection device 100 according to an embodiment.

As illustrated in FIG. 1, information processing system 1 includes monitoring server 10, vehicle 30, and network 40.

Monitoring server 10 is what is called a computer device and includes a processor (not illustrated in the drawings), memory (not illustrated in the drawings), a communication interface (not illustrated in the drawings), a storage device (not illustrated in the drawings), and a display (not illustrated in the drawings).

Monitoring server 10 provides anomaly detection device 100 and display unit 130 by the processor executing a program stored in the memory.

Vehicle 30 includes a communication function, and in-vehicle network 20 is mounted on vehicle 30. Vehicle 30 is, for example, an automobile.

Network 40 is a wide area network such as the Internet, and the connection targets of network 40 include anomaly detection device 100 and in-vehicle network 20.

Figure 2:
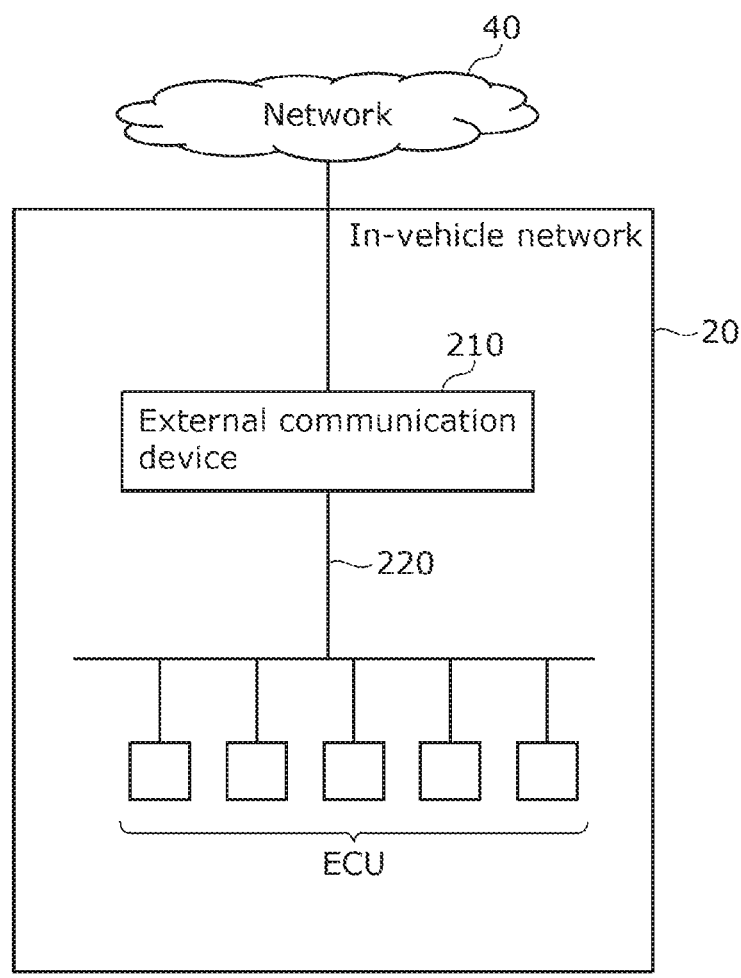
FIG. 2 is a block diagram illustrating one example of the configuration of an in-vehicle network according to an embodiment.

FIG. 2 is a block diagram illustrating one example of the configuration of in-vehicle network 20.

As illustrated in FIG. 2, in-vehicle network 20 includes external communication device 210, various electronic control units (ECUs), and bus 220.

In-vehicle network 20 performs communication in compliance with the CAN protocol, for example. Note that in-vehicle network 20 is not limited to the CAN and may be a communication network based on Ethernet (registered trademark) or FlexRay (registered trademark), for example.

Bus 220 is connected to each of the ECUs and external communication device 210 and transmits signals between the connected devices.

External communication device 210, which is connected to network 40 and bus 220, transmits, to network 40, a signal passing through bus 220, and sends, to bus 220, a signal received from network 40.

The ECUs mounted on vehicle 30 include, for example, an ECU related to a steering wheel, a brake, an engine, a door, a window, or the like. The ECU is, for example, a device including a digital circuit such as a processor and memory, an analog circuit, a communication circuit, and the like. The memory, which is read-only memory (ROM), random-access memory (RAM), or the like, is capable of storing a program to be executed by the processor. The ECU performs various functions, for example, by the processor executing the programs stored in the memory. The ECUs transmit and receive data via bus 220 in compliance with the CAN protocol, for example.

The ECUs transmit and receive the data complying with the CAN protocol to and from bus 220. For example, an ECU receives, from bus 220, data transmitted from another ECU, generates data including content to be transmitted to the other ECU, and transmits the generated data to bus 220. Specifically, each ECU performs a process corresponding to the content of the received data, generates data indicating the status of a sensor or a device connected to the ECU or data of an instruction value (control value) for another ECU, and transmits the generated value.

Figure 3:
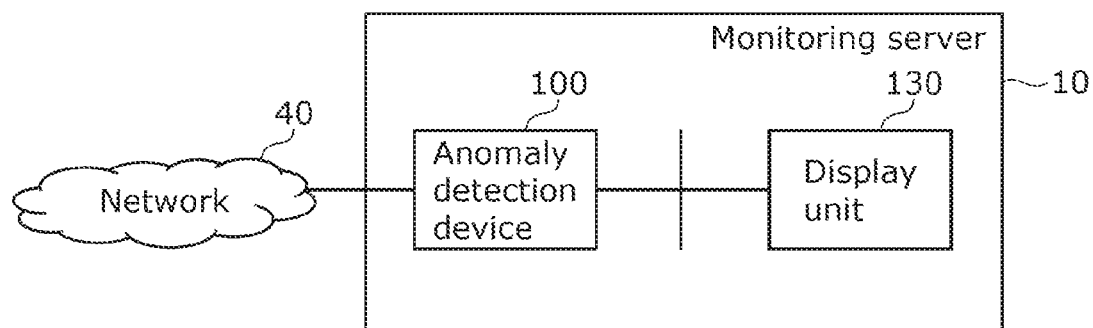
FIG. 3 is a block diagram illustrating one example of functions provided using a monitoring server according to an embodiment.

FIG. 3 is a block diagram illustrating one example of functions provided using monitoring server 10.

As illustrated in FIG. 3, monitoring server 10 provides anomaly detection device 100 and display unit 130.

Anomaly detection device 100 is connected to network 40 and display unit 130. Anomaly detection device 100 performs an anomaly detection process of detecting an anomaly in vehicle 30, and outputs the result to display unit 130. The anomaly detection process will be described later.

Display unit 130 is connected to anomaly detection device 100 and displays an image based on a signal output from anomaly detection device 100. The image displayed on display unit 130 will be described later.

For example, a user using information processing system 1 can recognize an anomaly in vehicle 30 by visually checking the content displayed on display unit 130.

Figure 4:
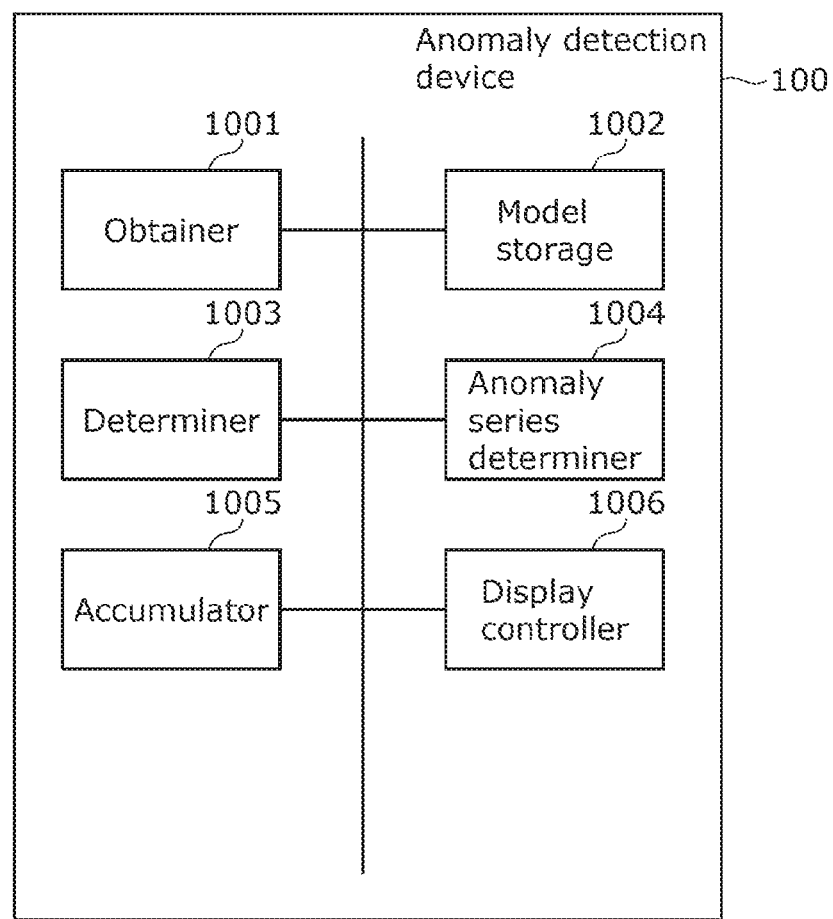
FIG. 4 is a block diagram illustrating one example of the configuration of an anomaly detection device according to an embodiment.

FIG. 4 is a block diagram illustrating one example of the configuration of anomaly detection device 100.

As illustrated in FIG. 4, anomaly detection device 100 includes obtainer 1001, model storage 1002, determiner 1003, anomaly series determiner 1004, accumulator 1005, and display controller 1006.

Obtainer 1001 obtains vehicle information related to the status of vehicle 30 and including location data indicating at least the location of vehicle 30. Obtainer 1001 sequentially obtains vehicle information at a predetermined time interval, for example.

Obtainer 1001 communicates with vehicle 30 via network 40, for example, thereby receives a vehicle control signal complying with the communication protocol of in-vehicle network 20 from vehicle 30, analyzes the received vehicle control signal, and thus obtains the vehicle information.

Herein, the vehicle information is described as including, in addition to the location data, speed data (which may also be referred to simply as "speed") indicating the travel speed of vehicle 30. The vehicle information may further include a turn curvature, acceleration, a yaw rate, an accelerator position, a steering level, and a shift position, for example.

Obtainer 1001 sequentially outputs the sequentially obtained vehicle information to determiner 1003 and accumulator 1005 and holds the latest vehicle information.

Model storage 1002 stores, for each of a plurality of cells of a grid imposed on a map, an evaluation model for evaluating vehicle information of vehicle 30 located at the cell. The data structure of the evaluation model will be described later with reference to FIG. 8 to be described later.

Figure 5:
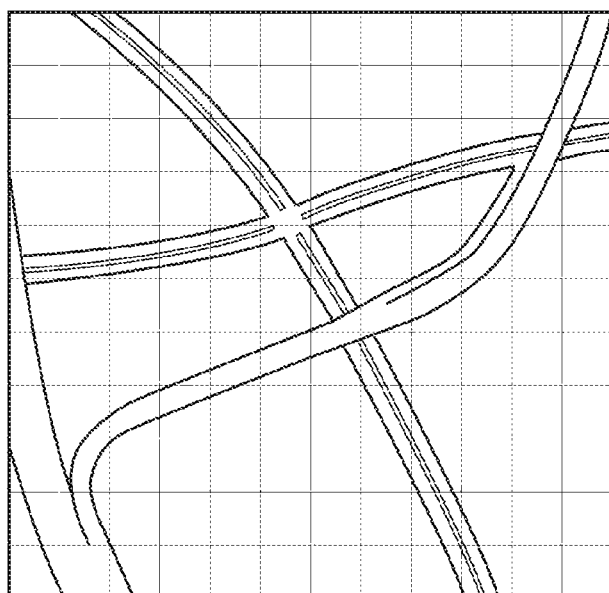
FIG. 5 is a schematic diagram illustrating one example of a map having a grid with a plurality of cells.

FIG. 5 is a schematic diagram illustrating one example of a map having a grid with a plurality of cells. In this description, it is assumed that the cells have the same square shape, as illustrated in FIG. 5. The length of one side of the cell may be the road width of a travel path for vehicle 30, for example, or may be a distance vehicle 30 travels for a unit of time, for example, or may be 50 m, for example.

Note that the cells are assumed herein to have the same square shape, but do not necessarily need to be limited to having the same square shape and may have any shape.

Returning to FIG. 4, the description of anomaly detection device 100 will be continued.

Determiner 1003 first refers to the location data included in the vehicle information each time obtainer 1001 sequentially obtains the vehicle information, and determines, on the basis of the location of vehicle 30, evaluation cells corresponding to evaluation models to be referred to in the anomaly detection process. Here, determiner 1003 determines, as the evaluation cells, cells including a first cell including the location of vehicle 30 indicated in the location data and one or more second cells having a predetermined positional relationship with the first cell.

Next, determiner 1003 obtains the evaluation models for the determined evaluation cells from model storage 1002. Subsequently, an anomaly level indicating the degree of anomaly of the vehicle information is calculated on the basis of the vehicle information and the evaluation models obtained.

Next, determiner 1003 determines, on the basis of the calculated anomaly level, whether the vehicle information is anomalous, and outputs the determination result. At this time, when the calculated anomaly level is greater than or equal to a threshold value and an evaluation data count, which is the sum of data items used to create the evaluation model for each cell included in the evaluation cells, is less than a first predetermined number, determiner 1003 corrects the anomaly level to reduce the degree of anomaly, and determines, on the basis of the corrected anomaly level, whether the vehicle information is anomalous. Here, when the calculated anomaly level is greater than or equal to the threshold value and the evaluation data count is less than the first predetermined number, determiner 1003 corrects the anomaly level by multiplying the anomaly level by the ratio of the evaluation data count to the first predetermined number.

Furthermore, when the calculated anomaly level is greater than or equal to the threshold value and the evaluation data count is less than a second predetermined number smaller than the first predetermined number, determiner 1003 corrects the anomaly level to reduce the degree of anomaly until the degree of anomaly indicates that the vehicle information is normal, and determines, on the basis of the corrected anomaly level, whether the vehicle information is anomalous.

Accumulator 1005 sequentially stores, in association with each other, the determination results sequentially output from determiner 1003 and the location data corresponding to the determination results. Here, when the vehicle information is output from obtainer 1001, accumulator 1005 stores the vehicle information once, and then when the determination result for the vehicle information is output from determiner 1003, stores the determination result in association with the vehicle information. The data structure of the vehicle information to be stored in accumulator 1005 that has not yet been associated with the determination result will be described later with reference to FIG. 6.

Anomaly series determiner 1004 obtains the determination result sequentially output from determiner 1003 (hereinafter, this determination result will be referred to as "the first determination result"). Subsequently, in the case where the first determination result indicates that the vehicle information is anomalous and a second determination result stored in accumulator 1005 the last time indicates that the vehicle information is anomalous, when the distance between a first location indicated in first location data corresponding to the first determination result and a second location indicated in second location data associated with the second determination result is less than a predetermined distance, anomaly series determiner 1004 determines the first determination result and the second determination result as being of the same anomaly series, and outputs the determination result.

Furthermore, in the case where anomaly series determiner 1004 determines the first determination result and the second determination result as being of the same anomaly series, anomaly series determiner 1004 determines that each of the first cell corresponding to the first determination result and the first cell corresponding to the second determination result is an anomalous cell.

Furthermore, in the case where anomaly series determiner 1004 determines the first determination result and the second determination result as being of the same anomaly series, when a first anomalous cell corresponding to the first determination result and a second anomalous cell corresponding to the second determination result have a predetermined relationship, anomaly series determiner 1004 further determines that a cell located between the first anomalous cell and the second anomalous cell is the anomalous cell.

Furthermore, in the case where anomaly series determiner 1004 determines the first determination result and the second determination result as being of the same anomaly series, when there is a cell adjacent to the first anomalous cell and the second anomalous cell and the road area ratio in said cell is less than a predetermined area ratio, anomaly series determiner 1004 further determines that said cell is the anomalous cell.

When the anomaly series determiner outputs a determination result indicating that the first determination result and the second determination result are of the same anomaly series, accumulator 1005 associates the vehicle information associated with the first determination result and the vehicle information associated with the second determination result with the same anomaly series identifier, and stores the associated vehicle information. The data structure of the vehicle information to be stored in accumulator 1005 that has already been associated with the determination result from determiner 1003 and the anomaly series identifier will be described later with reference to FIG. 7.

Display controller 1006 causes display unit 130 to display at least a portion of the map having the grid with the plurality of cells. More specifically, display controller 1006 causes display unit 130 to display at least a portion of the aforementioned map so that the anomalous cell set by anomaly series determiner 1004 is displayed in a display format different from the display format of the other cells.

<Data Structure>

Next, the structure of data to be handled by anomaly detection device 100 will be described.

FIG. 6 is a schematic diagram illustrating one example of the data structure of vehicle information to be stored in accumulator 1005 that has not yet been associated with the determination result from determiner 1003.

The vehicle information is generated each time obtainer 1001 receives the vehicle control signal from vehicle 30 via network 40 and analyzes the vehicle control signal.

As illustrated in FIG. 6, the vehicle information that has not yet been associated with the determination result includes: vehicle information ID which is an identifier for the vehicle information; vehicle ID which is an identifier for vehicle 30; a time stamp; location data indicating the location of vehicle 30; cell ID which is an identifier for a cell including the location of vehicle 30 (that is, the first cell); and information indicating the travel status of vehicle 30 (in this example, the travel speed, the steering angle, the yaw rate, the longitudinal acceleration, and the lateral acceleration).

FIG. 7 is a schematic diagram illustrating one example of the data structure of vehicle information to be stored in accumulator 1005 that has already been associated with the determination result from determiner 1003 and the anomaly series identifier.

As illustrated in FIG. 7, the vehicle information that has already been associated with the determination result and the anomaly series identifier includes the determination result from determiner 1003, the anomaly level calculated by determiner 1003, and anomaly series ID which is an identifier for the anomaly series determined by anomaly series determiner 1004 in addition to the vehicle information in FIG. 6 that has not yet been associated with the determination result.

FIG. 8 is a schematic diagram illustrating one example of the data structure of the evaluation model stored in model storage 1002.

As illustrated in FIG. 8, the evaluation model includes: cell ID which is an identifier for the cell; the longitudes and latitudes of the four corners of a cell region which are for specifying the cell region; the number of data items used to create the evaluation model; and the minimum and maximum values of information indicating the travel status of the vehicle (in this example, the travel speed, the steering angle, the yaw rate, the longitudinal acceleration, and the lateral acceleration).

Determiner 1003 calculates the anomaly level, for example, according to the degree of deviation of the travel status of the vehicle indicated in the vehicle information beyond the maximum or minimum value indicated in the evaluation model.

Furthermore, for example, when there are two or more evaluation cells, determiner 1003 calculates the anomaly level according to the degree of deviation beyond the maximum value that is largest among those indicated in two or more evaluation models or the minimum value that is smallest among those indicated in the two or more evaluation models.

Furthermore, determiner 1003 may calculate the anomaly level from the vehicle information and the evaluation model using a mechanical learning model learned in advance, for example. In this case, the evaluation model does not necessarily need to include the maximum and minimum values of the information indicating the travel status of the vehicle.

<Operation of Anomaly Detection Device>

As described above, anomaly detection device 100 performs an anomaly detection process of detecting an anomaly in vehicle 30.

Hereinafter, the anomaly detection process performed by anomaly detection device 100 will be described.

Figure 9:
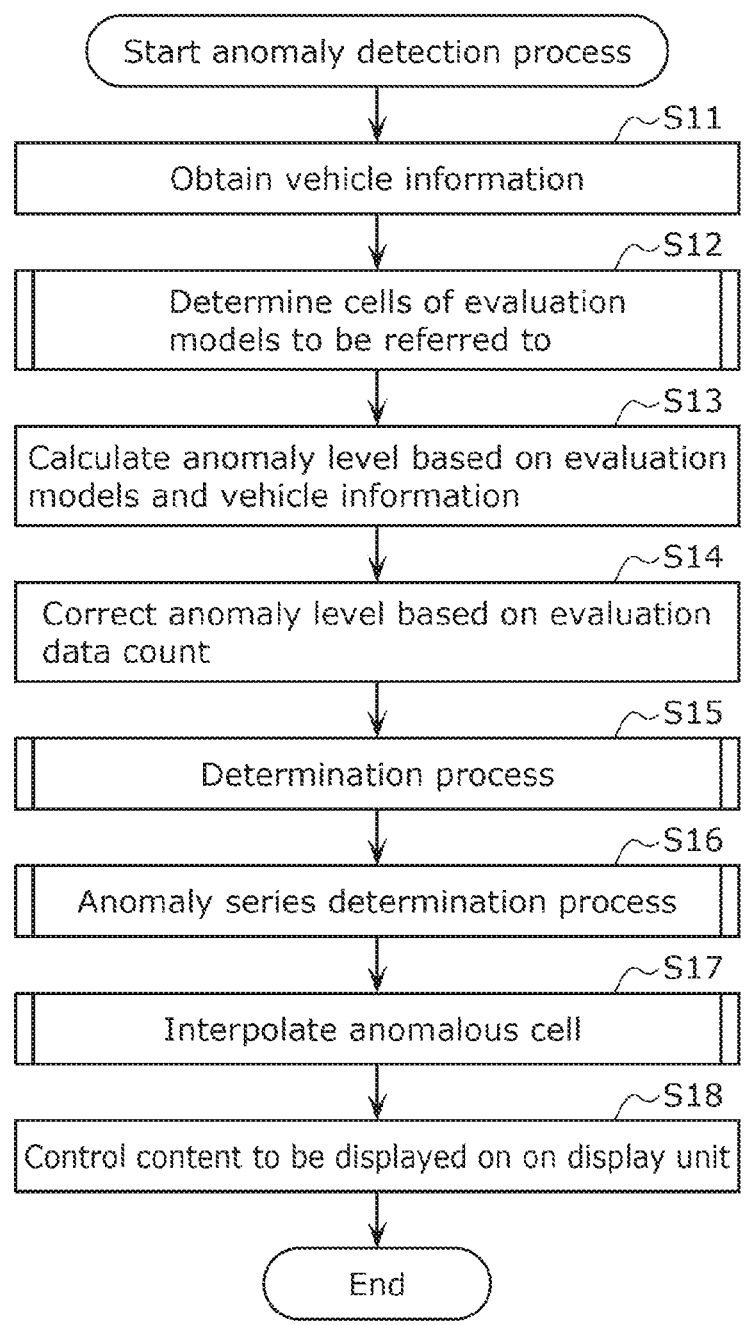
FIG. 9 is a flowchart of an anomaly detection process according to an embodiment.

FIG. 9 is a flowchart of the anomaly detection process.

Figure 10:
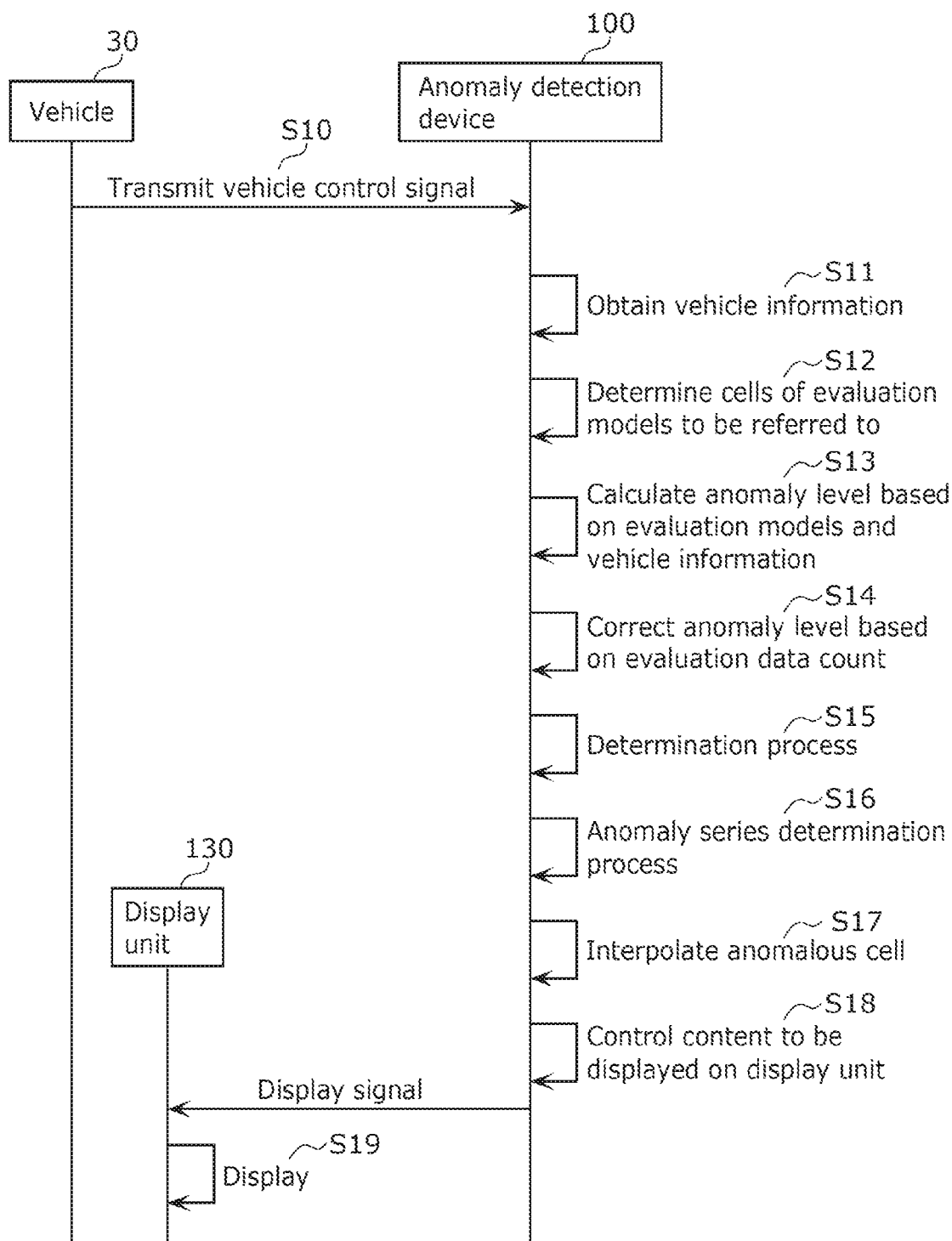
FIG. 10 is a sequence chart of an information processing system according to an embodiment.

FIG. 10 is a sequence chart of information processing system when anomaly detection device 100 performs the anomaly detection process.

The anomaly detection process starts by vehicle 30 transmitting the vehicle control signal to anomaly detection device 100 via network 40 (Step S10).

The vehicle control signal may be a CAN message or may be a signal measured by a sensor mounted on vehicle 30 or a device external to vehicle 30, for example. Here, the CAN message refers to data that is transmitted and received between the ECUs via bus 220 and complies with the CAN protocol.

When the anomaly detection process is started, obtainer 1001 receives the vehicle control signal, and obtains the vehicle information by analyzing the received vehicle control signal (Step S11).

When the vehicle information is obtained, determiner 1003 refers to the location data included in the vehicle information, and determines, on the basis of the location of vehicle 30, evaluation cells corresponding to the evaluation models to be referred to in the anomaly detection process (Step S12). A specific evaluation cell determination method will be described later with reference to FIG. 11 to FIG. 14C to be described later.

When the evaluation cells are determined, determiner 1003 obtains from model storage 1002 the evaluation models for the evaluation cells determined, and calculates, on the basis of the vehicle information and the evaluation models obtained, the anomaly level indicating the degree of anomaly of the vehicle information (Step S13).

When the anomaly level is calculated, determiner 1003 corrects the anomaly level on the basis of the evaluation data count (Step S14). A specific method for correcting the anomaly level will be described later with reference to FIG. 15 to be described later.

When the anomaly level is corrected, determiner 1003 determines, on the basis of the corrected anomaly level, whether the vehicle information is anomalous (Step S15). A specific determination method will be described later with reference to FIG. 16 to be described later.

After whether the vehicle information is anomalous is determined, in the case where the first determination result output from determiner 1003 indicates that the vehicle information is anomalous and the second determination result stored in accumulator 1005 the last time indicates that the vehicle information is anomalous, when the distance between the first location indicated in the first location data corresponding to the first determination result and the second location indicated in the second location data associated with the second determination result is less than the predetermined distance, anomaly series determiner 1004 determines the first determination result and the second determination result as being of the same anomaly series (Step S16). A specific anomaly series determination method will be described later with reference to FIG. 17 and FIG. 18 to be described later.

When the anomaly series is determined, anomaly series determiner 1004 interpolates an anomalous cell (Step S17). A specific anomalous cell interpolation method will be described later with reference to FIG. 19 and FIG. 20 to be described later.

When the anomalous cell is interpolated, display controller 1006 outputs a display signal to display unit 130, thus controls display content so that the anomalous cell is displayed in a display format different from the display format of the other cells, and causes display unit 130 to display at least a portion of the map having the grid with the plurality of cells (Step S18).

When the process in Step S18 is ended, anomaly detection device 100 ends the anomaly detection process.

In the anomaly detection process, when the display signal is output, display unit 130 obtains the display signal and displays an image based on the obtained display signal (Step S19). An example of the image displayed on display unit 130 will be described later with reference to FIG. 21 to be described later.

Figure 11:
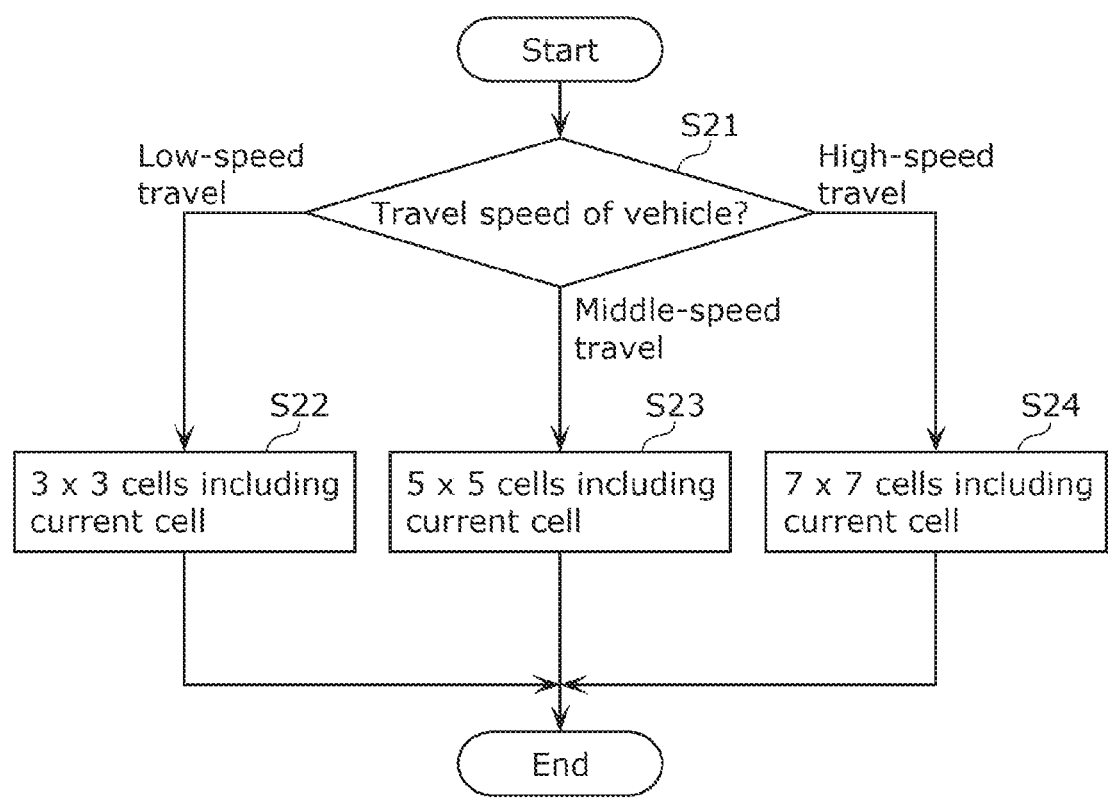
FIG. 11 is a flowchart illustrating one example of an evaluation cell determination method.

FIG. 11 is a flowchart illustrating one example of the evaluation cell determination method performed by determiner 1003. This determination method is one example of a determination method for determining, as the second cells, cells located on the radius of a circle centered on the first cell in which vehicle 30 is included.

When the travel speed of vehicle 30 indicated in the speed data is less than a first speed (for example, 30 km per hour), that is, when vehicle 30 travels at low speed (Step S21: Low-speed travel), determiner 1003 determines, as the second cells, eight cells obtained by removing the first cell from a total of nine cells of "3×3 cells" located on the radius of the circle centered on the first cell (Step S22). In other words, 3×3 cells including the first cell are determined as the evaluation cells.

Figure 12A:
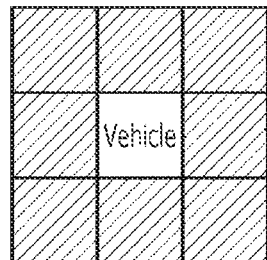
FIG. 12A is a schematic diagram illustrating evaluation cells.

FIG. 12A is a schematic diagram illustrating the aforementioned eight cells determined by determiner 1003.

When the travel speed of vehicle 30 indicated in the speed data is greater than or equal to the first speed, but less than a second speed (for example, 60 km per hour), that is, when vehicle 30 travels at middle speed (Step S21: Middle-speed travel), determiner 1003 determines, as the second cells, 24 cells obtained by removing the first cell from a total of 25 cells of "5×5 cells" located on the radius of the circle centered on the first cell (Step S23). In other words, 5×5 cells including the first cell are determined as the evaluation cells.

Figure 12B:
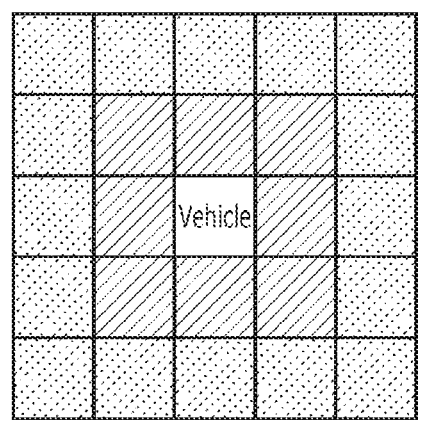
FIG. 12B is a schematic diagram illustrating evaluation cells.

FIG. 12B is a schematic diagram illustrating the aforementioned 24 cells determined by determiner 1003.

When the travel speed of vehicle 30 indicated in the speed data is greater than or equal to the second speed, that is, when vehicle 30 travels at high speed (Step S21: High-speed travel), determiner 1003 determines, as the second cells, 48 cells obtained by removing the first cell from a total of 49 cells of "7×7 cells" located on the radius of the circle centered on the first cell (Step S24). In other words, 7×7 cells including the first cell are determined as the evaluation cells.

Figure 12C:
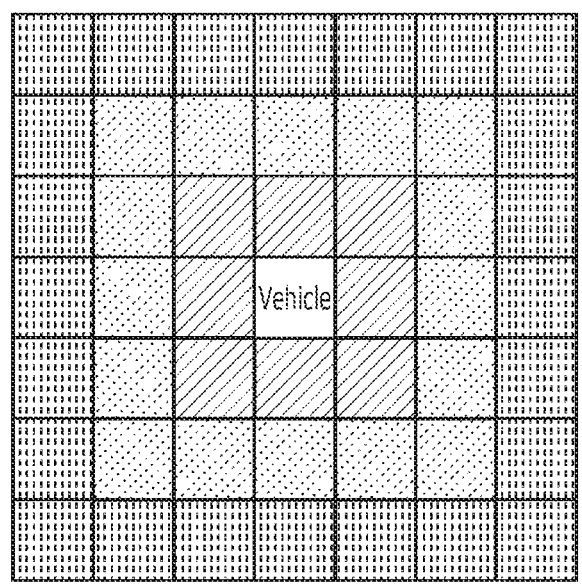
FIG. 12C is a schematic diagram illustrating evaluation cells.

FIG. 12C is a schematic diagram illustrating the aforementioned 48 cells determined by determiner 1003.

Thus, determiner 1003 sets first predetermined positional relationship and second predetermined positional relationship so that the number of second cells each having the second predetermined positional relationship is greater than the number of second cells each having the first predetermined positional relationship in the case where when the travel speed of vehicle 30 is less than the first speed, determiner 1003 sets the first predetermined positional relationship to the predetermined positional relationship and when the travel speed of vehicle 30 is greater than or equal to the first speed, determiner 1003 sets the second predetermined positional relationship to the predetermined positional relationship.

Figure 13:
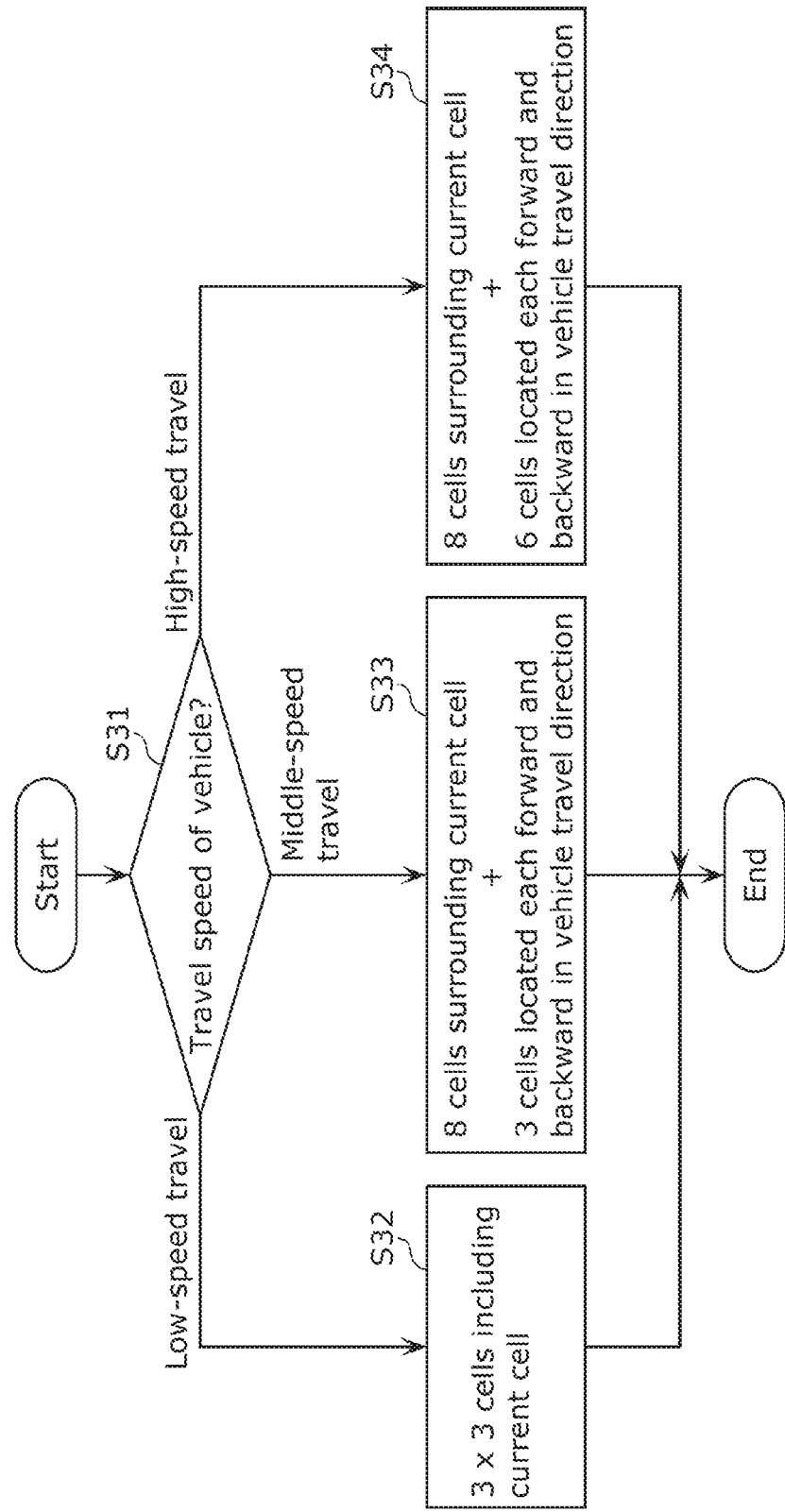
FIG. 13 is a flowchart illustrating one example of an evaluation cell determination method.

FIG. 13 is a flowchart illustrating another example of the evaluation cell determination method performed by determiner 1003. This determination method is one example of a determination method for determining, as the second cells, cells located in specific directions with respect to the first cell in which vehicle 30 is included.

When the travel speed of vehicle 30 indicated in the speed data is less than the first speed (for example, 30 km per hour), that is, when vehicle 30 travels at low speed (Step S31: Low-speed travel), determiner 1003 determines, as the second cells, eight cells obtained by removing the first cell from a total of nine cells of "3×3 cells" located on the radius of the circle centered on the first cell (Step S32). In other words, 3×3 cells including the first cell are determined as the evaluation cells.

Figure 14A:
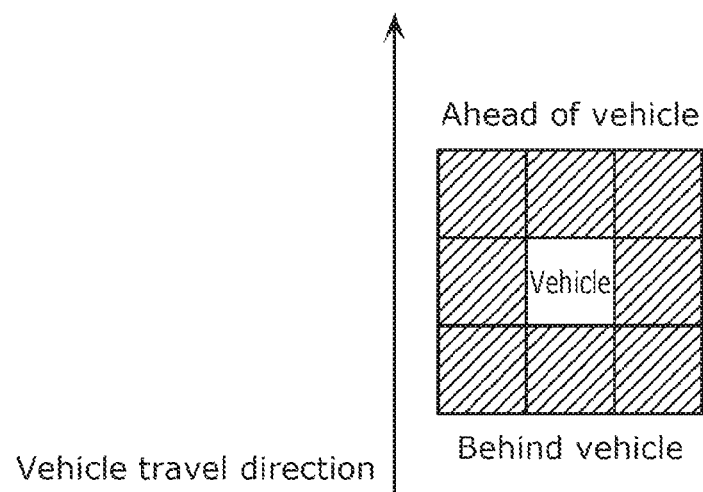
FIG. 14A is a schematic diagram illustrating evaluation cells.

FIG. 14A is a schematic diagram illustrating the aforementioned eight cells determined by determiner 1003.

When the travel speed of vehicle 30 indicated in the speed data is greater than or equal to the first speed, but less than the second speed (for example, 60 km per hour), that is, when vehicle 30 travels at middle speed (Step S31: Middle-speed travel), determiner 1003 determines, as the second cells, 14 cells obtained by adding, to the aforementioned eight cells, three cells located ahead of the vehicle in the vehicle travel direction and three cells located behind the vehicle in the vehicle travel direction (Step S33). In other words, 3×3 cells including the first cell and three cells located each forward and backward in the vehicle travel direction are determined as the evaluation cells.

Figure 14B:
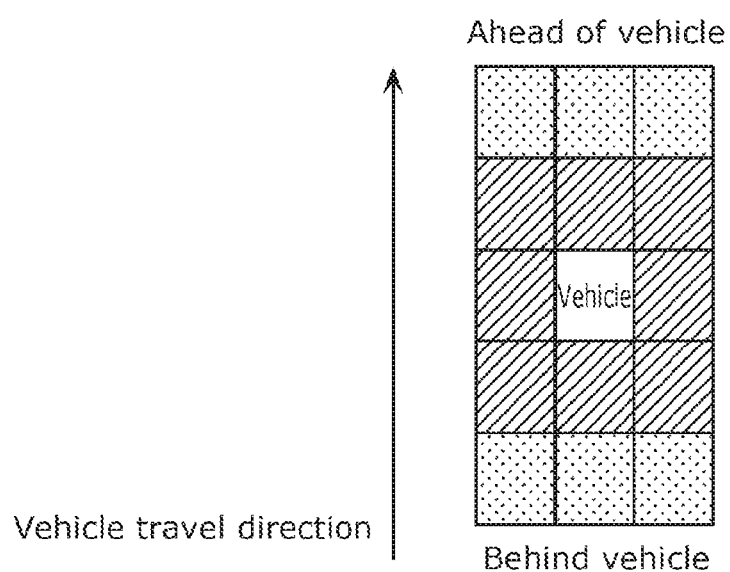
FIG. 14B is a schematic diagram illustrating evaluation cells.

FIG. 14B is a schematic diagram illustrating the aforementioned 14 cells determined by determiner 1003.

When the travel speed of vehicle 30 indicated in the speed data is greater than or equal to the second speed, that is, when vehicle 30 travels at high speed (Step S31: High-speed travel), determiner 1003 determines, as the second cells, a total of 20 cells obtained by adding, to the aforementioned 14 cells, three cells located ahead of the vehicle in the vehicle travel direction and three cells located behind the vehicle in the vehicle travel direction (Step S34). In other words, 3×3 cells including the first cell and six cells located each forward and backward in the vehicle travel direction are determined as the evaluation cells.

Figure 14C:
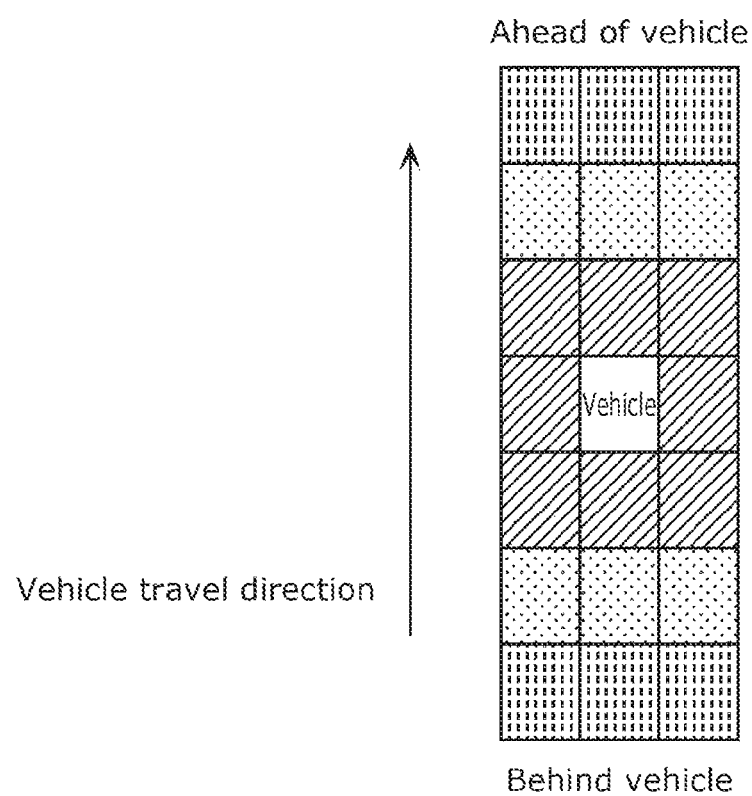
FIG. 14C is a schematic diagram illustrating evaluation cells.

FIG. 14C is a schematic diagram illustrating the aforementioned 20 cells determined by determiner 1003.

Thus, determiner 1003 sets first predetermined positional relationship and second predetermined positional relationship so that the number of second cells arranged in a first direction (in this example, the vehicle travel direction) from the first cell among the second cells each having the second predetermined positional relationship is greater than the number of second cells arranged in the first direction from the first cell among the second cells each having the first predetermined positional relationship in the case where when the travel speed of vehicle 30 is less than the first speed, determiner 1003 sets the first predetermined positional relationship to the predetermined positional relationship and when the travel speed of vehicle 30 is greater than or equal to the first speed, determiner 1003 sets the second predetermined positional relationship to the predetermined positional relationship.

FIG. 15 is a flowchart illustrating one example of a method in which determiner 1003 corrects the anomaly level.

In creating the evaluation model, a certain number of data items are needed in order to sufficiently cover data within cells. However, since the grid with the plurality of cells is imposed on the map, there are cases where the number of data items used to create the evaluation model for each cell is biased. Therefore, if the number of data items used to create the evaluation model is not enough, determiner 1003 corrects the anomaly level so as to reflect, in the anomaly level, the fact that the number of data items is not enough.

The anomaly level to be corrected by determiner 1003 is an anomaly level indicating that the vehicle information is anomalous. Therefore, determiner 1003 determines whether the anomaly level is greater than or equal to a threshold value indicating that the vehicle information is anomalous (Step S41), and when determiner 1003 determines that the anomaly level is less than the threshold value (Step S41: No), determiner 1003 does not correct the anomaly level.

When determiner 1003 determines that the anomaly level is greater than or equal to the threshold value (Step S41: Yes), determiner 1003 checks an evaluation data count which is the sum of data items used to create the evaluation model for each cell included in the evaluation cells (Step S42).

When the evaluation data count is greater than or equal to the first predetermined number indicating that the number of data items used to create the evaluation model is enough (First predetermined number evaluation data count in Step S42) in the process in Step S42, determiner 1003 does not correct the anomaly level because the number of data items used to create the evaluation model is enough.

Here, the first predetermined number may be, for example, a value obtained by multiplying the number of cells included in the evaluation cells by a predetermined number, that is, a value indicating that the number of data items used to create the evaluation model per cell is enough.

When the evaluation data count is greater than or equal to the second predetermined number indicating that the number of data items used to create the evaluation model is deficient, but less than the first predetermined number (Second predetermined number≤evaluation data count <first predetermined number in Step S42) in the process in Step S42, determiner 1003 corrects the anomaly level to reduce the degree of anomaly because the number of data items used to create the evaluation model is not enough, but is not deficient (Step S44). At this time, determiner 1003 corrects the degree of anomaly by multiplying the degree of anomaly by the ratio of the evaluation data count to the first predetermined number.

Here, the second predetermined number may be, for example, a value obtained by multiplying the number of cells included in the evaluation cells by a predetermined number, that is, a value indicating that the number of data items used to create the evaluation model per cell is deficient.

When the evaluation data count is less than the second predetermined number (Evaluation data count <second predetermined number) in the process in Step S42, determiner 1003 corrects the anomaly level to reduce the degree of anomaly until the degree of anomaly indicates that the vehicle information is normal, that is, to have a normal value, because the number of data items used to create the evaluation model is deficient (Step S43).

Figure 16:
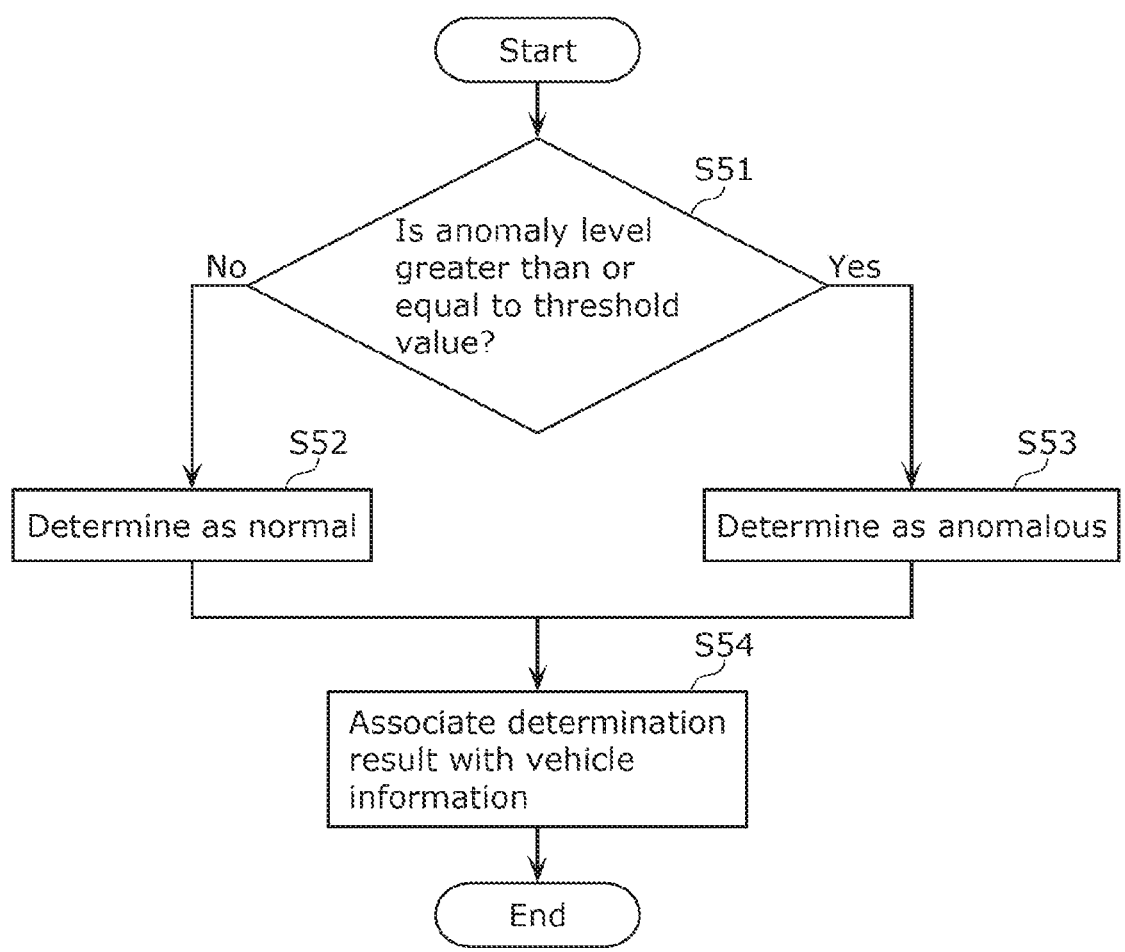
FIG. 16 is a flowchart illustrating one example of a determination method used to determine whether vehicle information is anomalous.

FIG. 16 is a flowchart illustrating one example of a determination method in which determiner 1003 determines whether the vehicle information is anomalous.

Determiner 1003 determines whether the anomaly level corrected or not corrected by the anomaly level correction method illustrated in FIG. 15 is greater than or equal to the threshold value indicating that the vehicle information is anomalous (Step S51). When determiner 1003 determines that the anomaly level is greater than or equal to the threshold value in the process in Step S51 (Step S51: Yes), determiner 1003 determines that the vehicle information is anomalous (Step S53), and when determiner 1003 determines that the anomaly level is less than the threshold value (Step S51: No), determiner 1003 determines that the vehicle information is normal (Step S52). Subsequently, accumulator 1005 stores the determination result from determiner 1003 in association with the vehicle information (Step S54).

Figure 17:
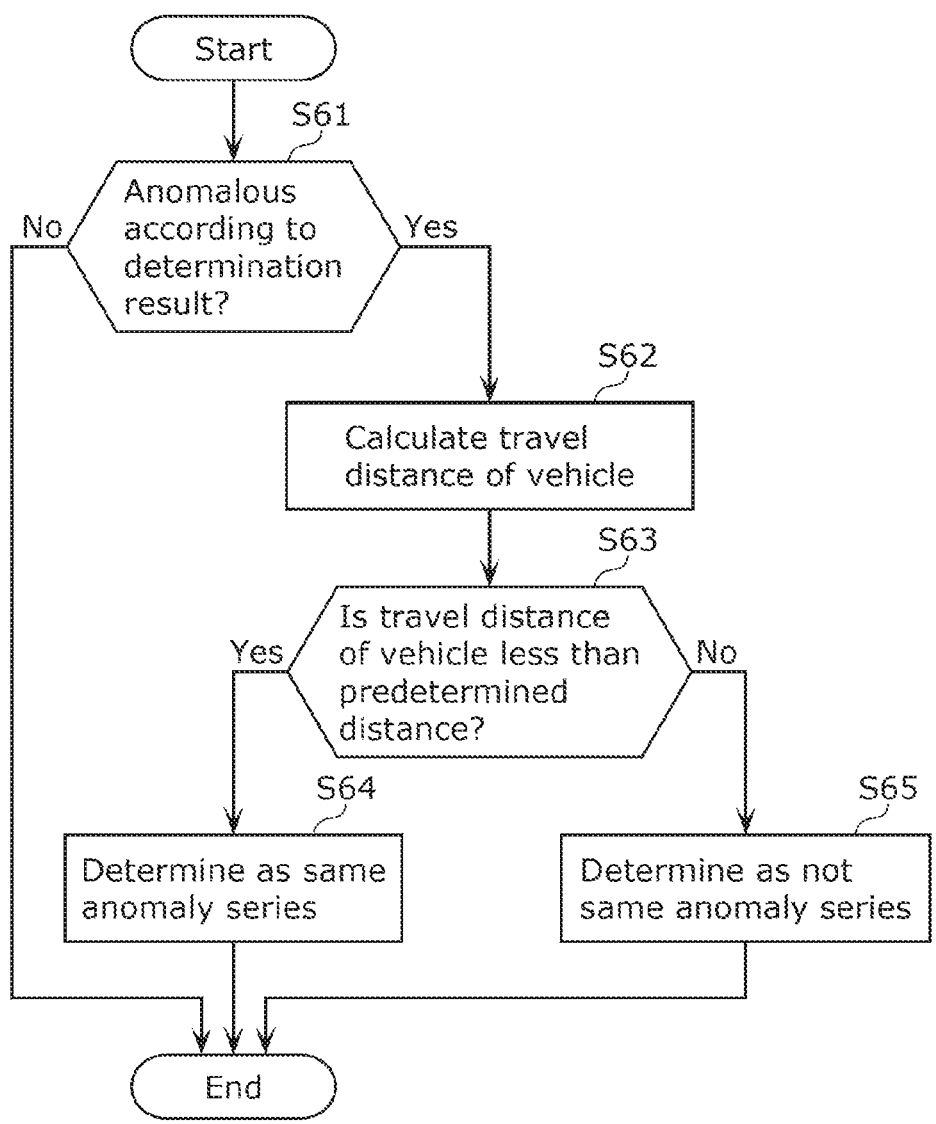
FIG. 17 is a flowchart illustrating one example of an anomaly series determination method.

FIG. 17 is a flowchart illustrating one example of an anomaly series determination method performed by anomaly series determiner 1004.

When determiner 1003 determines that the vehicle information is anomalous, anomaly series determiner 1004 determines whether said anomaly belongs to the same anomaly series of anomalies that continuously occur from the anomaly determined in the past. The determination result of this determination can be useful, for example, in providing a notification to the driver of vehicle 30 and an analytical work by an analyst who deals with the anomaly.

When determiner 1003 determines whether the vehicle information is anomalous, anomaly series determiner 1004 checks whether the determination result (hereinafter also referred to as "the first determination result") is anomalous (Step S61).

When the first determination result is "normal" in the process in Step S61 (Step S61: No), anomaly series determiner 1004 does not determine that the first determination result is of the same anomaly series as the first determination result. Therefore, accumulator 1005 assigns information that does not indicate a specific anomaly series, for example, signal "–", to the anomaly series ID of vehicle information corresponding to the first determination result, and stores the vehicle information, for example.

When the first determination result is "anomalous" in the process in Step S61 (Step S61: Yes), anomaly series determiner 1004 calculates the travel distance of vehicle 30 from the first location indicated in the vehicle information corresponding to the first determination result to the second location indicated in the vehicle information that is the latest vehicle information stored in accumulator 1005 and has been determined by determiner 1003 as being anomalous (hereinafter also referred to as "the second determination result") (Step S62).

When the travel distance of vehicle 30 is calculated, anomaly series determiner 1004 determines whether the travel distance of the vehicle is less than a predetermined distance (Step S63).

When the travel distance of the vehicle is determined as being less than the predetermined distance in the process in Step S63 (Step S63: Yes), anomaly series determiner 1004 determines that the first determination result and the second determination result are of the same anomaly series (Step S64). Therefore, accumulator 1005 assigns the same anomaly series ID as the anomaly series ID of the vehicle information corresponding to the second determination result, to the anomaly series ID of the vehicle information corresponding to the first determination result, and stores the vehicle information, for example.

When the travel distance of the vehicle is determined as being greater than or equal to the predetermined distance in the process in Step S63 (Step S63: No), anomaly series determiner 1004 determines that the first determination result and the second determination result are not of the same anomaly series (Step S65). Therefore, accumulator 1005 assigns new anomaly series ID different from the anomaly series ID of the vehicle information corresponding to the second determination result, to the anomaly series ID of the vehicle information corresponding to the first determination result, and stores the vehicle information, for example.

Figure 18:
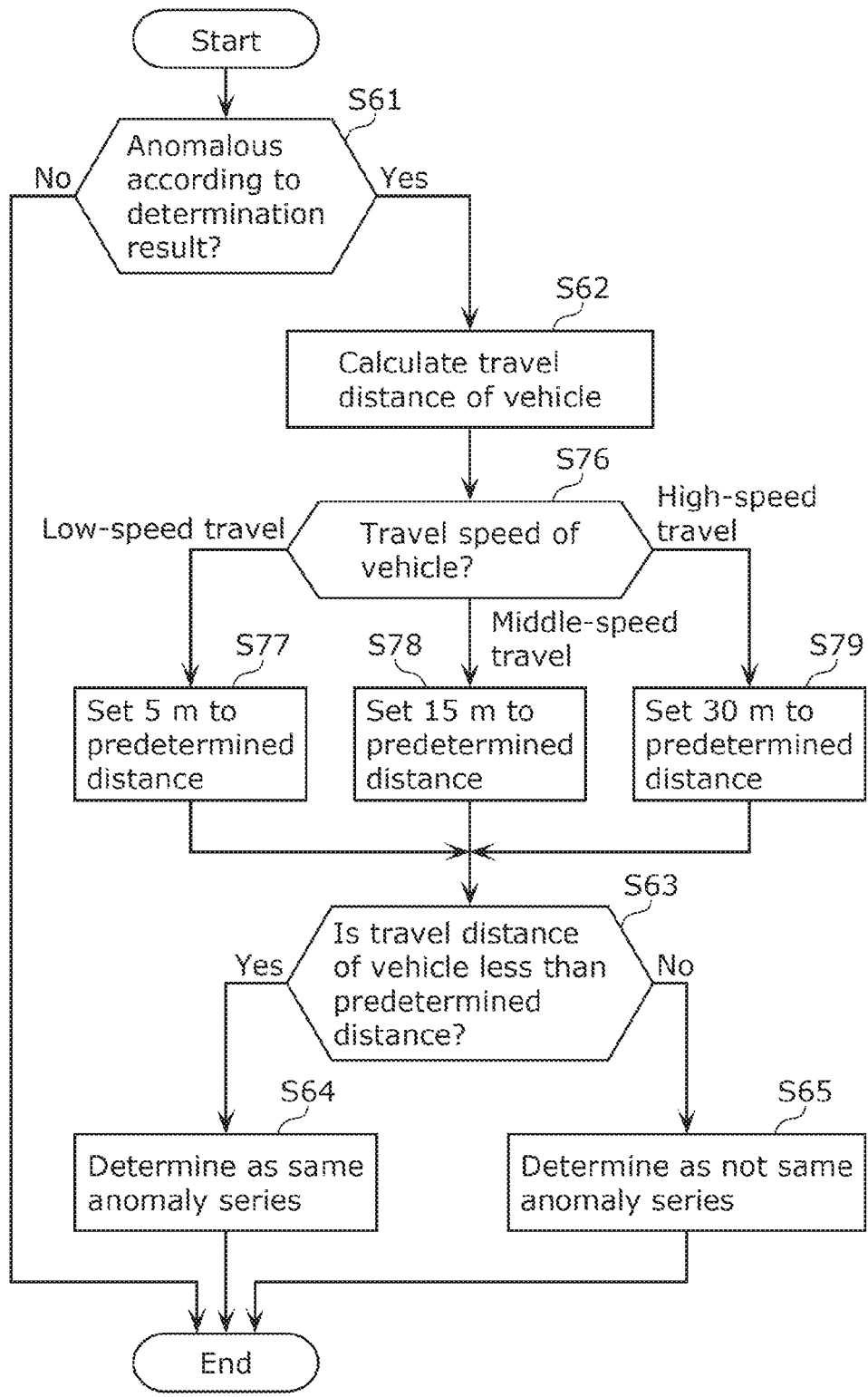
FIG. 18 is a flowchart illustrating one example of an anomaly series determination method.

FIG. 18 is a flowchart illustrating another example of an anomaly series determination method performed by anomaly series determiner 1004.

The anomaly series determination method illustrated in FIG. 17 is one example of the determination method performed when the predetermined distance is a fixed value. In contrast, the anomaly series determination method illustrated in FIG. 18 is one example of the determination method performed when the predetermined distance depends on the travel speed of vehicle 30.

Therefore, the anomaly series can be determined with higher accuracy in the anomaly series determination method illustrated in FIG. 18 than in the anomaly series determination method illustrated in FIG. 17.

The anomaly series determination method illustrated in FIG. 18 is a determination method different from the anomaly series determination method illustrated in FIG. 17 in that the process in Step S76 to the process in Step S79 are additionally included. Therefore, the following description focuses on the process in Step S76 to the process in Step S79.

When the travel distance of vehicle 30 is calculated in the process in Step S62, anomaly series determiner 1004 checks the travel speed of vehicle 30 indicated in the speed data (Step S76).

When the travel speed of vehicle 30 is less than the first speed (for example, 30 km/h), that is, when vehicle 30 travels at low speed (Step S76: Low-speed travel) in the process in Step S76, anomaly series determiner 1004 sets 5 m to the predetermined distance (Step S77).

When the travel speed of vehicle 30 is greater than or equal to the first speed, but less than the second speed (for example, 60 km/h), that is, when vehicle 30 travels at middle speed (Step S76: Middle-speed travel) in the process in Step S76, anomaly series determiner 1004 sets 15 m to the predetermined distance (Step S78).

When the travel speed of vehicle 30 is greater than or equal to the second speed, that is, when vehicle 30 travels at high speed (Step S76: High-speed travel) in the process in Step S76, anomaly series determiner 1004 sets 30 m to the predetermined distance (Step S79).

When the process in Step S77, the process in Step S78, or the process in Step S79 is ended, the processing proceeds to the process in Step S63.

Figure 19:
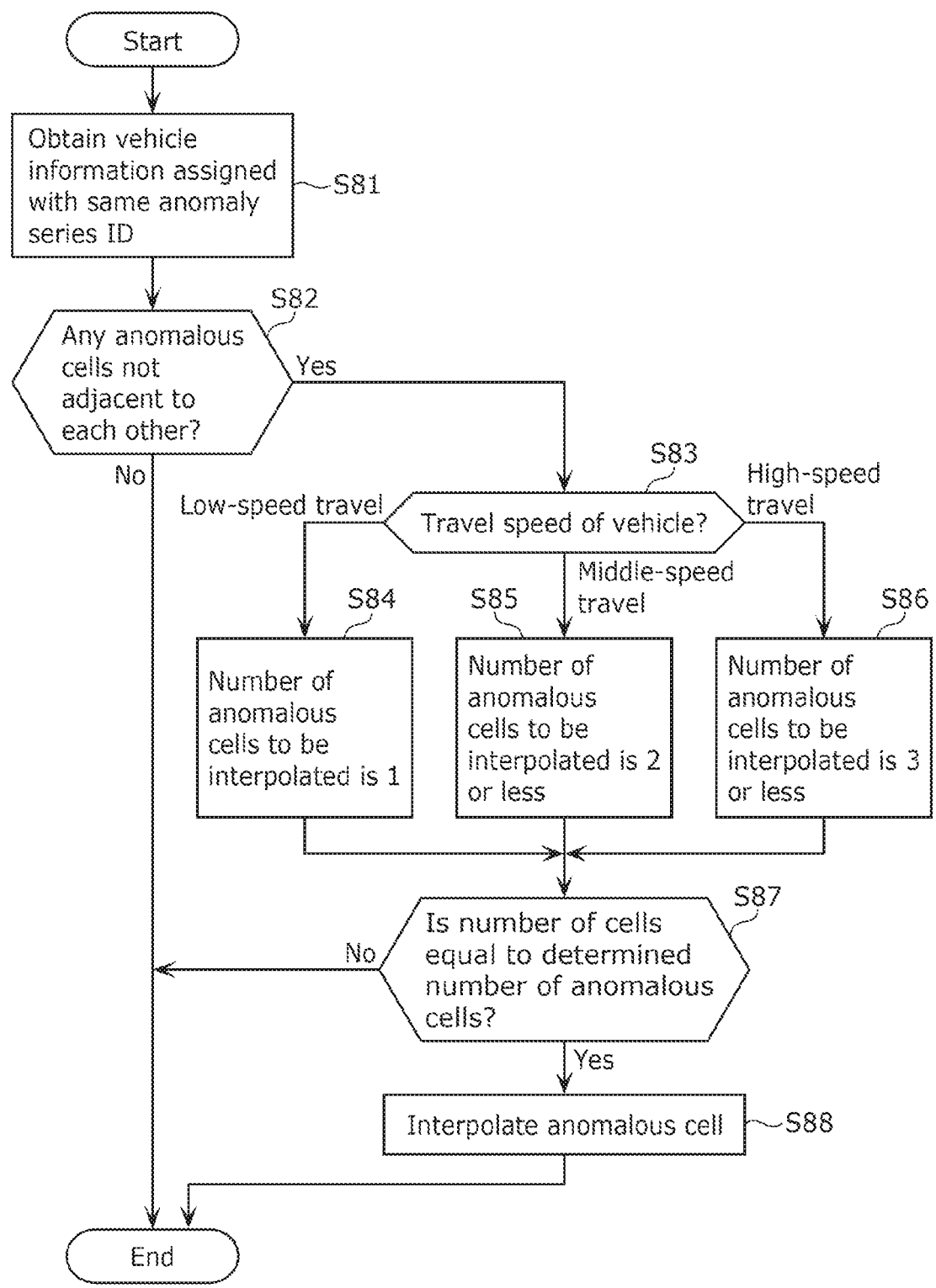
FIG. 19 is a flowchart illustrating one example of an anomalous cell interpolation method.

FIG. 19 is a flowchart illustrating one example of an anomalous cell interpolation method performed by anomaly series determiner 1004.

When vehicle 30 travels at high speed as compared to the cell size or when the location data does not accurately indicate the location of vehicle 30 due to the effects of noise or the like, for example, there are cases where the anomalous cells corresponding to the determination results determined as being of the same anomaly series are not necessarily adjacent to each other. In the case where the anomalous cells corresponding to the determination results determined as being of the same anomaly series are not adjacent to each other, a cell located between these anomalous cells is also regarded as an anomalous cell; thus, it is possible to more accurately determine a section in which an anomaly related to vehicle 30 is occurring.

Anomaly series determiner 1004 obtains vehicle information assigned with the same anomaly series ID from the vehicle information stored in accumulator 1005 (Step S81), and checks whether the anomalous cells corresponding to the determination results determined as being of the same anomaly series include anomalous cells that are not adjacent to each other (Step S82).

When there are no anomalous cells that are not adjacent to each other in the process in Step S82 (Step S82: No), anomaly series determiner 1004 ends the process.

When there are anomalous cells that are not adjacent to each other in the process in Step S82 (Step S82: Yes), anomaly series determiner 1004 checks the travel speed of vehicle 30 indicated in the speed data (Step S83).

When the travel speed of vehicle 30 is less than the first speed (for example, 30 km/h), that is, when vehicle 30 travels at low speed (Step S83: Low-speed travel) in the process in Step S83, anomaly series determiner 1004 determines that the number of anomalous cells to be interpolated is one (Step S84).

When the travel speed of vehicle 30 is greater than or equal to the first speed, but less than the second speed (for example, 60 km/h), that is, when vehicle 30 travels at middle speed (Step S83: Middle-speed travel) in the process in Step S83, anomaly series determiner 1004 determines that the number of anomalous cells to be interpolated is two (Step S85).

When the travel speed of vehicle 30 is greater than or equal to the second speed, that is, when vehicle 30 travels at high speed (Step S83: High-speed travel) in the process in Step S83, anomaly series determiner 1004 determines that the number of anomalous cells to be interpolated is three (Step S86).

When the number of anomalous cells to be interpolated is determined through the process in Step S84, the process in Step S85, or the process in Step S86, anomaly series determiner 1004 determines whether the number of cells located between the anomalous cells that are not adjacent to each other is the determined number of anomalous cells (Step S87).

When the number of cells located between the anomalous cells that are not adjacent to each other is the determined number of anomalous cells in the process in Step S87 (Step S87: Yes), anomaly series determiner 1004 determines a cell located between the anomalous cells as an anomalous cell to interpolate the anomalous cell (Step S88).

When the number of cells located between the anomalous cells that are not adjacent to each other is not the determined number of anomalous cells in the process in Step S87 (Step S87: No), anomaly series determiner 1004 does not determine a cell located between the anomalous cells as an anomalous cell to not interpolate the anomalous cell.

Figure 20:
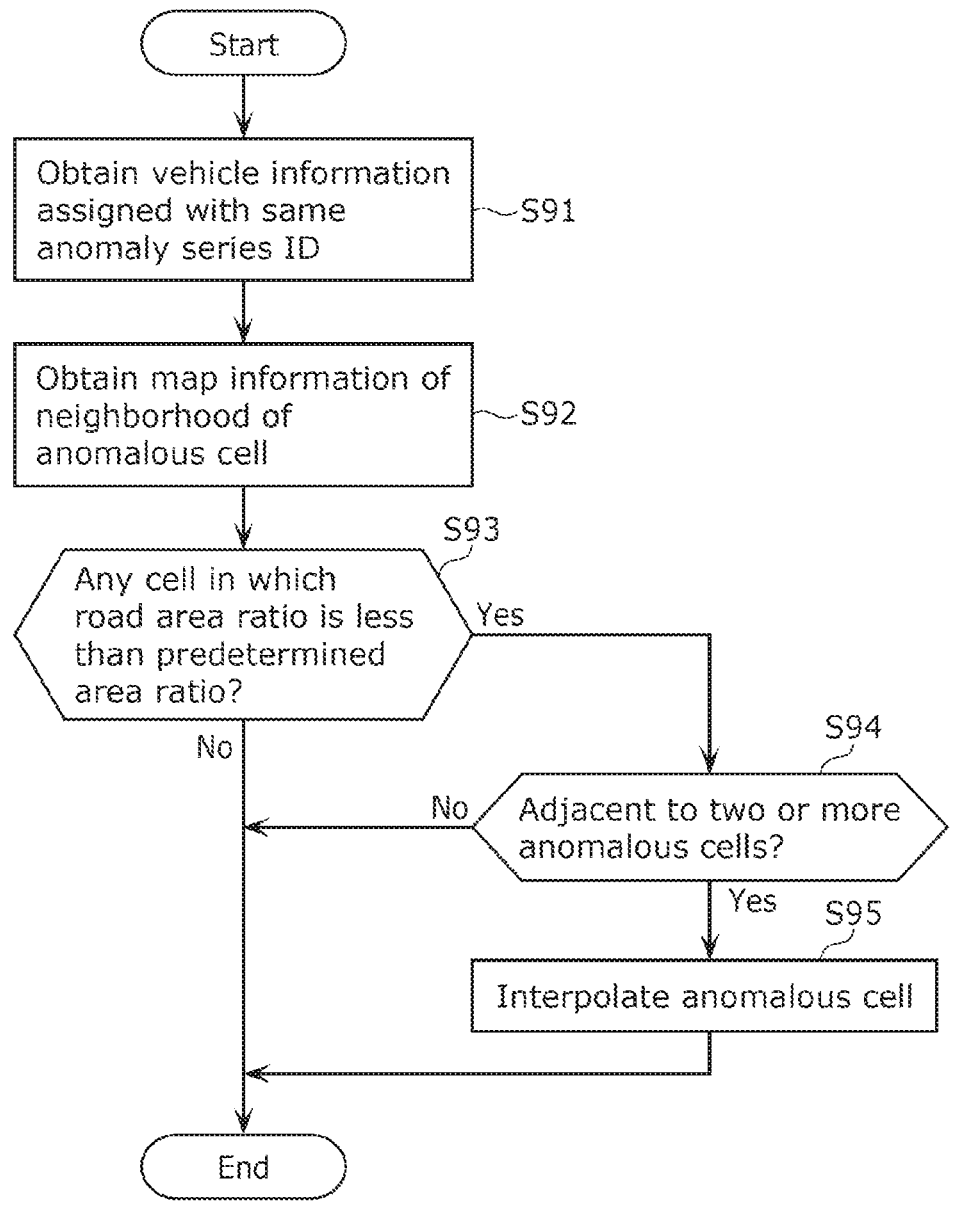
FIG. 20 is a flowchart illustrating one example of an anomalous cell interpolation method.

FIG. 20 is a flowchart illustrating another example of the anomalous cell interpolation method performed by anomaly series determiner 1004.

In the case where a grid with a plurality of cells is imposed on a map, there may be a cell in which the ratio of a road area included in said cell is relatively low. When the ratio of a road area included in a cell is relatively low, the vehicle information of said cell is less likely to be obtained. Therefore, it is anticipated that a cell to be determined as an anomalous cell may not be determined as an anomalous cell. In order to deal with this, in a travel path of vehicle 30, a cell in which the ratio of a road area included in said cell is relatively low and which is adjacent to two or more anomalous cells is also determined as an anomalous cell, and thus a cell having a relatively low road area ratio can be determined as an anomalous cell.

Anomaly series determiner 1004 obtains the vehicle information assigned with the same anomaly series ID from the vehicle information stored in accumulator 1005 (Step S91).

When the vehicle information is obtained, anomaly series determiner 1004 obtains map information of the neighborhood of the anomalous cell corresponding to the obtained vehicle information (Step S92).

When the map information is obtained, anomaly series determiner 1004 determines, on the basis of the map information, whether the cells in the travel path of vehicle 30 include a cell that has not been determined as an anomalous cell and in which the road area ratio is less than a predetermined area ratio (Step S93).

When there is a corresponding cell in the process in Step S93 (Step S93: Yes), anomaly series determiner 1004 determines whether the corresponding cell is adjacent to two or more anomalous cells (Step S94).

When there is no corresponding cell in the process in Step S93 (Step S93: No), anomaly series determiner 1004 ends the process.

When the corresponding cell is adjacent to two or more anomalous cells in the process in Step S94 (Step S94: Yes), anomaly series determiner 1004 determines the corresponding cell as an anomalous cell to interpolate the anomalous cell (Step S95).

When the corresponding cell is not adjacent to two or more anomalous cells in the process in Step S94 (Step S94: No), anomaly series determiner 1004 does not determine the corresponding cell as an anomalous cell to not interpolate the anomalous cell.

When anomaly series determiner 1004 interpolates the anomalous cell, display controller 1006 causes display unit 130 to display at least a portion of the map having the grid with the plurality of cells in such a manner that said anomaly cell is displayed in a display format different from the display format of the other cells.

Figure 21:
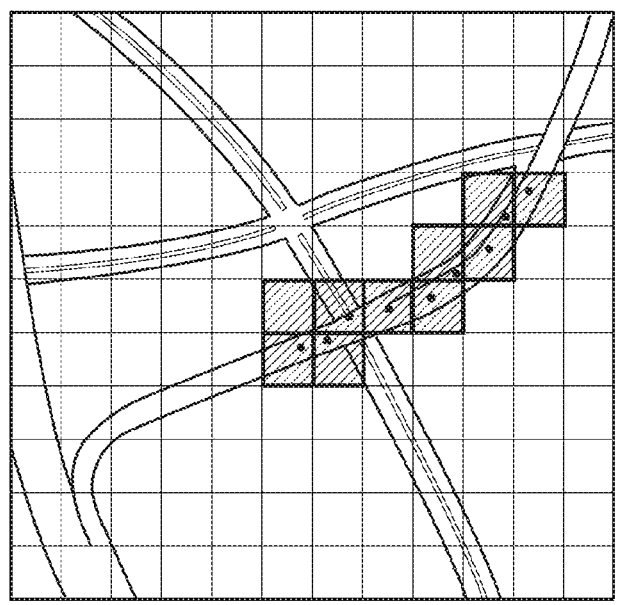
FIG. 21 is a schematic diagram illustrating one example of an image displayed on a display unit according to an embodiment.

FIG. 21 is a schematic diagram illustrating one example of an image which display controller 1006 causes display unit 130 to display. In FIG. 21, the cells shaded with diagonal lines are the anomalous cells determined by anomaly series determiner 1004, and the black-filled circles indicate the locations of vehicle 30 indicated in the vehicle information determined by determiner 1003 as being anomalous.

In this manner, display controller 1006 can cause display unit 130 to effectively display the detection result of anomaly detection device 100 in order to make the detection result useful, for example, in providing a notification to the driver of vehicle 30 and an analytical work by an analyst who deals with the anomaly.

<Review>

As described above, anomaly detection device 100 determines, on the basis of the evaluation models for evaluation cells each having a predetermined positional relationship with the location of vehicle 30, whether the vehicle information is anomalous. Therefore, with anomaly detection device 100, it is possible to detect a vehicle-related anomaly on the basis of the evaluation models for a local region corresponding to the location of vehicle 30. Thus, with anomaly detection device 100, it is possible to detect anomalies with improved accuracy compared to the conventional anomaly detection device.

Furthermore, with anomaly detection device 100, the range of cells to be used as the evaluation cells can be more appropriately determined according to the travel speed of vehicle 30. Moreover, with anomaly detection device 100, in the case where the number of data items used to create the evaluation model is not enough due to a grid with a plurality of cells being imposed on the map, resulting in the number of data items used to create the evaluation model for each cell being biased, the anomaly level can be corrected so as to reflect the fact that the number of data items is not enough. In addition, with anomaly detection device 100, it is possible to group, as anomalies of the same anomaly series, anomalies that occur continuously from an anomaly determined in the past.

Thus, with anomaly detection device 100, it is possible to effectively detect an anomaly in vehicle 30.

(Additional Comments)

As described above, the embodiment is presented as an exemplification of the technique disclosed in the present application. However, the present disclosure is not limited to this embodiment. Various modifications to the present embodiment that can be conceived by those skilled in the art, and forms configured by combining structural elements in different embodiments, without departing from the teachings of the present disclosure may be included in the scope of one or more aspects of the present disclosure.

(1) In the embodiment, anomaly detection device 100 is described as including anomaly series determiner 1004, accumulator 1005, and display controller 1006. In this regard, as another example, anomaly detection device 100 may be configured without including anomaly series determiner 1004, accumulator 1005, or display controller 1006; instead, anomaly series determiner 1004, accumulator 1005, and display controller 1006 may be provided in an external device. In this case, anomaly series determiner 1004, accumulator 1005, and display controller 1006 may be provided in monitoring server 10, for example.

(2) In the embodiment, the map having the grid with the plurality of cells may be a map prepared in advance or may be a dynamically generated map such as a dynamic map. In the case of the dynamically generated map, the evaluation models may be updated every time a new map is generated, for example.

(3) In the embodiment, the anomaly in vehicle 30 detected by anomaly detection device 100 is described as an anomaly due to a cyberattack or the like on vehicle 30, for example. However, the anomaly in vehicle 30 detected by anomaly detection device 100 is not limited to this example. Anomaly detection device 100 can detect an anomaly related to the operation, etc., of the driver of vehicle 30, for example. For example, unintended acceleration can be detected from the position of the accelerator pedal.

(4) In the embodiment, vehicle 30 is described as an automobile, for example. However, vehicle 30 is not limited to the automobile. Examples of vehicle 30 include mobile vehicles such as construction machines as mobile bodies and agricultural machines, watercrafts, railroad trains, and airplanes as mobile bodies. In other words, anomaly detection device 100 can also detect anomalies in mobile vehicles or mobility networks and mobility network systems for mobile vehicles.

(5) In the embodiment, the branches from the process in Step S21, the branches from the process in Step S31, the branches from the process in Step S63, and the branches from the process in Step S83 are three branches, namely, the low-speed travel, the middle-speed travel, and the high-speed travel, but the branches are not limited to this example. The branches may be two branches or may be subdivided into three or more branches.

(6) Some or all of the structural elements included in anomaly detection device 100 may be implemented as a dedicated or general-purpose circuit.

Some or all of the structural elements included in anomaly detection device 100 may be configured from a single system Large Scale Integration (LSI), for example. A system LSI is a super-multifunction LSI manufactured with a plurality of components integrated on a single chip, and is specifically a computer system configured of a microprocessor, read-only memory (ROM), and random-access memory (RAM), for example. A computer program is stored in the ROM. The system LSI achieves its function as a result of the microprocessor operating according to the computer program.

Note that although a system LSI is mentioned here, there are instances where the designations IC, LSI, super LSI, and ultra LSI are used depending on the level of integration. Furthermore, the method of circuit integration is not limited to LSIs, and implementation through a dedicated circuit or a general-purpose processor is also possible. A field programmable gate array (FPGA) which allows programming after LSI manufacturing or a reconfigurable processor which allows reconfiguration of the connections and settings of the circuit cells inside the LSI may also be used.

In addition, depending on the emergence of circuit integration technology that replaces LSI due to progress in semiconductor technology or other derivative technology, it is obvious that such technology may be used to integrate the function blocks. Possibilities in this regard include the application of biotechnology and the like.

(7) One aspect of the present disclosure may be not only anomaly detection device 100 described above, but also an anomaly detection method including, as steps, characteristic components included in anomaly detection device 100. Furthermore, one aspect of the present disclosure may also be a computer program for causing a computer to execute the respective characteristic steps included in the anomaly detection method. Moreover, one aspect of the present disclosure may also be a non-transitory computer-readable recording medium on which this sort of computer program is recorded.

INDUSTRIAL APPLICABILITY

The present disclosure can be widely used for an anomaly detection device that detects a vehicle-related anomaly.

The invention claimed is:

1. An anomaly detection device, comprising:
 a communication interface that obtains vehicle information related to a status of a vehicle and including location data indicating a location of the vehicle;
 a model storage that stores, for each of a plurality of cells of a grid imposed on a map, an evaluation model for evaluating the vehicle information of the vehicle located at a first cell of the plurality of cells; and
 a processor that calculates, based on the vehicle information and evaluation models each being the evaluation model, an anomaly level indicating a degree of anomaly of the vehicle information, determines, based on the anomaly level, whether the vehicle information is anomalous, and outputs a determination result, the evaluation models corresponding to evaluation cells including the first cell including the location of the vehicle indicated in the location data and one or more second cells each having a predetermined positional relationship with the first cell.

2. The anomaly detection device according to claim 1, wherein
 when the anomaly level is greater than or equal to a threshold value, the processor determines that the vehicle information is anomalous.

3. The anomaly detection device according to claim 1, wherein
 when the anomaly level is greater than or equal to a threshold value and an evaluation data count is less than a first predetermined number, the processor corrects the anomaly level to reduce the degree of anomaly, and determines, based on the anomaly level corrected, whether the vehicle information is anomalous, the evaluation data count being a sum of data items used to create the evaluation model for each cell included in the evaluation cells.

4. The anomaly detection device according to claim 3, wherein
 when the anomaly level is greater than or equal to the threshold value and the evaluation data count is less than a second predetermined number smaller than the first predetermined number, the processor corrects the anomaly level to reduce the degree of anomaly until the degree of anomaly indicates that the vehicle information is normal.

5. The anomaly detection device according to claim 3, wherein
 when the anomaly level is greater than or equal to the threshold value and the evaluation data count is less than the first predetermined number, the processor corrects the anomaly level by multiplying the anomaly level by a ratio of the evaluation data count to the first predetermined number.

6. The anomaly detection device according to claim 1, wherein
 the vehicle information further includes speed data indicating a travel speed of the vehicle,
 when the travel speed indicated in the speed data is less than a first speed, the processor sets a first predetermined positional relationship to the predetermined positional relationship, and when the travel speed is greater than or equal to the first speed, the processor sets a second predetermined positional relationship to the predetermined positional relationship, and a total number of the second cells each having the second predetermined positional relationship is greater than a total number of the second cells each having the first predetermined positional relationship.

7. The anomaly detection device according to claim 1, wherein the vehicle information further includes speed data indicating a travel speed of the vehicle, when the travel speed indicated in the speed data is less than a first speed, the processor sets a first predetermined positional relationship to the predetermined positional relationship, and when the travel speed is greater than or equal to the first speed, the processor sets a second predetermined positional relationship to the predetermined positional relationship, and a total number of the second cells arranged in a first direction from the first cell among the second cells each having the second predetermined positional relationship is greater than a total number of the second cells arranged in the first direction from the first cell among the second cells each having the first predetermined positional relationship.

8. The anomaly detection device according to claim 1, wherein the communication interface sequentially obtains the vehicle information, the processor sequentially calculates the anomaly level, sequentially determines whether the vehicle information is anomalous, and sequentially outputs the determination result, and the anomaly detection device further comprises:
  a memory that sequentially stores, in association with each other, the determination result sequentially output from the processor and the location data corresponding to the determination result; and
  an anomaly series processor that, in a case where a first determination result output from the processor indicates that the vehicle information is anomalous and a second determination result stored in the memory a last time indicates that the vehicle information is anomalous, when a distance between a first location indicated in first location data corresponding to the first determination result and a second location indicated in second location data associated with the second determination result is less than a predetermined distance, determines the first determination result and the second determination result as being of a same anomaly series.

9. The anomaly detection device according to claim 8, wherein the vehicle information further includes speed data indicating a travel speed of the vehicle, and when the first determination result output from the processor indicates that the vehicle information is anomalous, the anomaly series processor sets the predetermined distance according to the travel speed indicated in the speed data corresponding to the first determination result.

10. The anomaly detection device according to claim 8, further comprising:

a display controller that causes a display to display at least a portion of the map, wherein in a case where the anomaly series processor determines the first determination result and the second determination result as being of the same anomaly series, the anomaly series processor determines that each of the first cell corresponding to the first determination result and the first cell corresponding to the second determination result is an anomalous cell, and the display controller causes the display to display at least a portion of the map in a manner that an anomalous cell is displayed in a display format different from a display format of other cells.

11. The anomaly detection device according to claim 10, wherein in the case where the anomaly series processor determines the first determination result and the second determination result as being of the same anomaly series, when a first anomalous cell corresponding to the first determination result and a second anomalous cell corresponding to the second determination result have a predetermined relationship, the anomaly series processor further determines that a cell located between the first anomalous cell and the second anomalous cell is the anomalous cell.

12. The anomaly detection device according to claim 11, wherein the vehicle information further includes speed data indicating a travel speed of the vehicle, and when the first determination result indicates that the vehicle information is anomalous, the anomaly series processor sets the predetermined relationship according to the travel speed indicated in the speed data corresponding to the first determination result.

13. The anomaly detection device according to claim 10, wherein in the case where the anomaly series processor determines the first determination result and the second determination result as being of the same anomaly series, when a cell adjacent to a first anomalous cell corresponding to the first determination result and a second anomalous cell corresponding to the second determination result exists and a road area ratio in the cell is less than a predetermined area ratio, the anomaly series processor further determines that the cell is the anomalous cell.

14. An anomaly detection method performed by an anomaly detection device that stores, for each of a plurality of cells of a grid imposed on a map, an evaluation model for evaluating vehicle information related to a status of a vehicle located at a first cell of the plurality of cells and including location data of the vehicle, the anomaly detection method comprising:

obtaining the vehicle information;

calculating, based on evaluation models each being the evaluation model, an anomaly level indicating a degree of anomaly of the vehicle information, the evaluation models corresponding to evaluation cells including the first cell including a location of the vehicle indicated in the location data and one or more second cells each having a predetermined positional relationship with the first cell;

determining, based on the anomaly level, whether the vehicle information is anomalous; and outputting a determination result.

15. A non-transitory computer-readable recording medium having recorded thereon a program for causing an anomaly detection device to perform an anomaly detection process, the anomaly detection device storing, for each of a plurality of cells of a grid imposed on a map, an evaluation model for evaluating vehicle information related to a status of a vehicle located at a first cell of the plurality of cells and including location data of the vehicle, the anomaly detection process including:
   obtaining the vehicle information;
   calculating, based on evaluation models each being the evaluation model, an anomaly level indicating a degree of anomaly of the vehicle information, the evaluation models corresponding to evaluation cells including the first cell including a location of the vehicle indicated in the location data and one or more second cells each having a predetermined positional relationship with the first cell;
   determining, based on the anomaly level, whether the vehicle information is anomalous; and
   outputting a determination result.

* * * * *